(12) United States Patent
Axnäs et al.

(10) Patent No.: US 12,369,193 B2
(45) Date of Patent: Jul. 22, 2025

(54) METHOD FOR ACCESSING A CELLULAR COMMUNICATIONS NETWORK IN UNLICENSED SPECTRUM

(71) Applicant: Telefonaktiebolaget LM Ericsson (publ), Stockholm (SE)

(72) Inventors: Johan Axnäs, Solna (SE); Stephen Grant, Pleasanton, CA (US); Jung-Fu Cheng, Fremont, CA (US); David Sugirtharaj, Lund (SE); Johan Rune, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 864 days.

(21) Appl. No.: 17/608,641

(22) PCT Filed: Apr. 30, 2020

(86) PCT No.: PCT/EP2020/062172
§ 371 (c)(1),
(2) Date: Nov. 3, 2021

(87) PCT Pub. No.: WO2020/225142
PCT Pub. Date: Nov. 12, 2020

(65) Prior Publication Data
US 2022/0225411 A1     Jul. 14, 2022

Related U.S. Application Data

(60) Provisional application No. 62/842,610, filed on May 3, 2019.

(51) Int. Cl.
*H04W 74/0816* (2024.01)
*H04J 13/00* (2011.01)
(Continued)

(52) U.S. Cl.
CPC ..... *H04W 74/0816* (2013.01); *H04J 13/0062* (2013.01); *H04L 1/0068* (2013.01); *H04W 56/0045* (2013.01); *H04W 74/0833* (2013.01)

(58) Field of Classification Search
CPC ......... H04W 74/0816; H04W 56/0045; H04W 74/0833; H04W 74/0808; H04W 16/14;
(Continued)

(56) References Cited

U.S. PATENT DOCUMENTS

2016/0095040 A1 * 3/2016 Valliappan .......... H04W 36/302
                                                                      370/332
2019/0349998 A1 * 11/2019 Bhattad ................. H04L 1/0013
(Continued)

FOREIGN PATENT DOCUMENTS

| EP | 3471330 A1 | 4/2019 |
|----|------------|--------|
| EP | 3621403 A1 | 3/2020 |
| WO | 2018203696 A1 | 11/2018 |

OTHER PUBLICATIONS

Title: Initial access and mobility for NR-U Source: LG Electronics 3GPP TSG RAN WG1 #96; R1-1902041; Athens, Greece, Feb. 25-Mar. 1, 2019 (Year: 2019).*
(Continued)

*Primary Examiner* — Michael Y Mapa
(74) *Attorney, Agent, or Firm* — Weisberg I.P. Law, P.A.

(57) ABSTRACT

A method for accessing a cellular communications network in unlicensed spectrum is provided. More specifically, the method is related to performing a Listen-Before-Talk (LBT) procedure prior to transmitting a Physical Random Access Channel (PRACH) preamble for accessing a New Radio-Unlicensed (NR-U) network. A User Equipment (UE) first performs the LBT procedure. If the LBT procedure is successful, the UE then generates a punctured PRACH preamble and transmits the punctured PRACH preamble. By puncturing the PRACH preamble, it is possible to create a
(Continued)

gap(s) for performing the LBT procedure in a way that is backward compatible with existing NR-U specification and does not reduce a number of random access occasions in a slot or a mini-slot. As a result, it is possible to transmit PRACH preambles in consecutive random access occasions, thus helping to increase spectrum utilization and reduce latency in the cellular communications network.

15 Claims, 17 Drawing Sheets

(51) Int. Cl.
  *H04L 1/00* (2006.01)
  *H04W 56/00* (2009.01)
  *H04W 74/0833* (2024.01)
(58) Field of Classification Search
  CPC .. H04W 74/004; H04J 13/0062; H04L 1/0068
  USPC .................................. 370/329; 455/450–454
  See application file for complete search history.

(56) References Cited

U.S. PATENT DOCUMENTS

2020/0275492 A1\* 8/2020 Lei ..................... H04W 74/0808
2021/0307068 A1\* 9/2021 Kim .................. H04W 74/0816

OTHER PUBLICATIONS

Author Unknown, "Technical Specification Group Radio Access Network; Physical layer procedures for shared spectrum channel access (Release 15)," Technical Specification 37.213, Version 15.2.0, Mar. 2019, 3GPP Organizational Partners, 20 pages.
Author Unknown, "Technical Specification Group Radio Access Network; NR; Physical channels and modulation (Release 15)," Technical Specification 38.211, Version 15.4.0, Dec. 2018, 3GPP Organizational Partners, 96 pages.
Author Unknown, "Technical Specification Group Radio Access Network; NR; Physical layer procedures for control (Release 15)," Technical Specification 38.213, Version 15.5.0, Mar. 2019, 3GPP Organizational Partners, 104 pages.
CATT, "R1-164199: PRACH design for Rel-14 eLAA," 3GPP TSG RAN WG1 Meeting #85, May 23-27, 2016, Nanjing, China, 4 pages.
Ericsson, "R1-1907451: Initial access signals and channels," 3GPP TSG-RAN WG1 Meeting #97, May 13-17, 2019, Reno, Nevada, 11 pages.
LG Electronics, "R1-1902041: Initial access and mobility for NR-U," 3GPP TSG RAN WG1 #96, Feb. 25-Mar. 1, 2019, Athens, Greece, 22 pages.
Panasonic, "R1-1906082: Initial access signals/channels for NR-U," 3GPP TSG RAN WG1 #97, May 13-17, 2019, Reno, Nevada, 3 pages.
Qualcomm Incorporated, "R1-1904996: Initial access signals and channels for NR-U," 3GPP TSG RAN WG1 Meeting #96bis, Apr. 8-12, 2019, Xi'an, China, 22 pages.
Samsung, "R1-1808769: Initial Access and Mobility Procedure for NR-U," 3GPP TSG RAN WG1 Meeting #94, Aug. 20-24, 2018, Gothenburg, Sweden, 8 pages.
Zte, et al., "R1-1903878: On the channel structure of msgA," 3GPP TSG RAN WG1 Meeting #96bis, Apr. 8-12, 2019, Xi'an, China, 10 pages.
International Search Report and Written Opinion for International Patent Application No. PCT/EP2020/062172, mailed Aug. 4, 2020, 13 pages.
Extended European Search Report and Search Opinion dated May 28, 2024 for Patent Application No. 24161570.7, consisting of 9 pages.
3GPP TSG RAN WG1 Meeting #94bis R1-1810861; Title: Initial Access and Mobility Procedure for NR-U; Agenda Item: 7.2.2.4.2; Source: Samsung; Document for: Discussion and Decision; Date and Location: Oct. 8-12, 2018, Chengdu, China, consisting of 8 pages.
Examination Report for Indian Patent Application No. 202117049925, mailed May 9, 2022, 7 pages.

\* cited by examiner

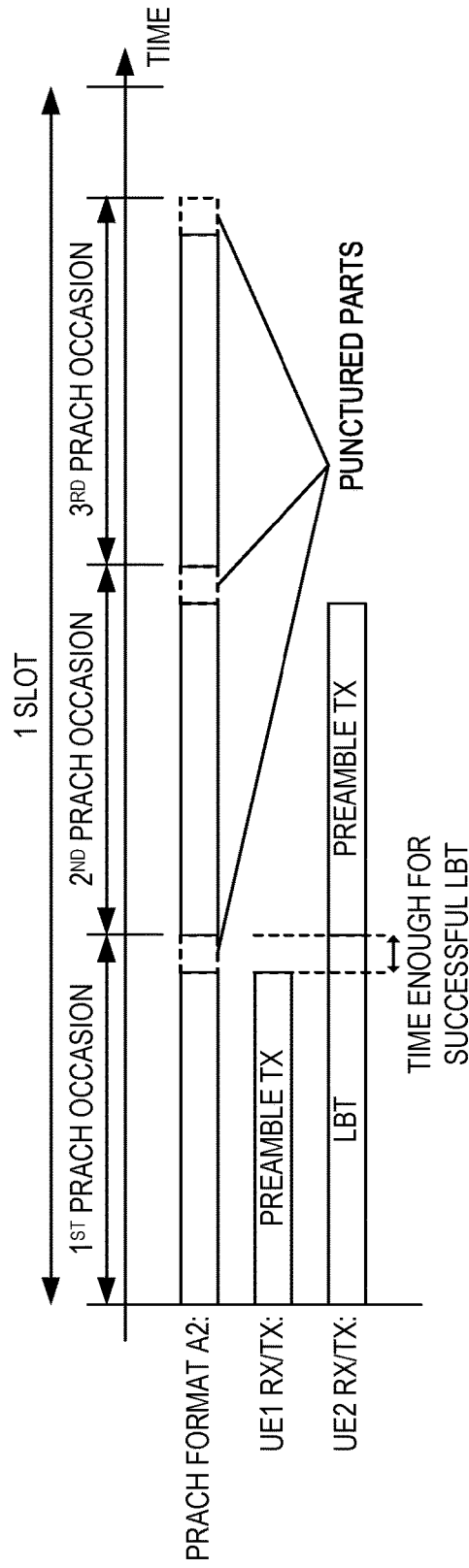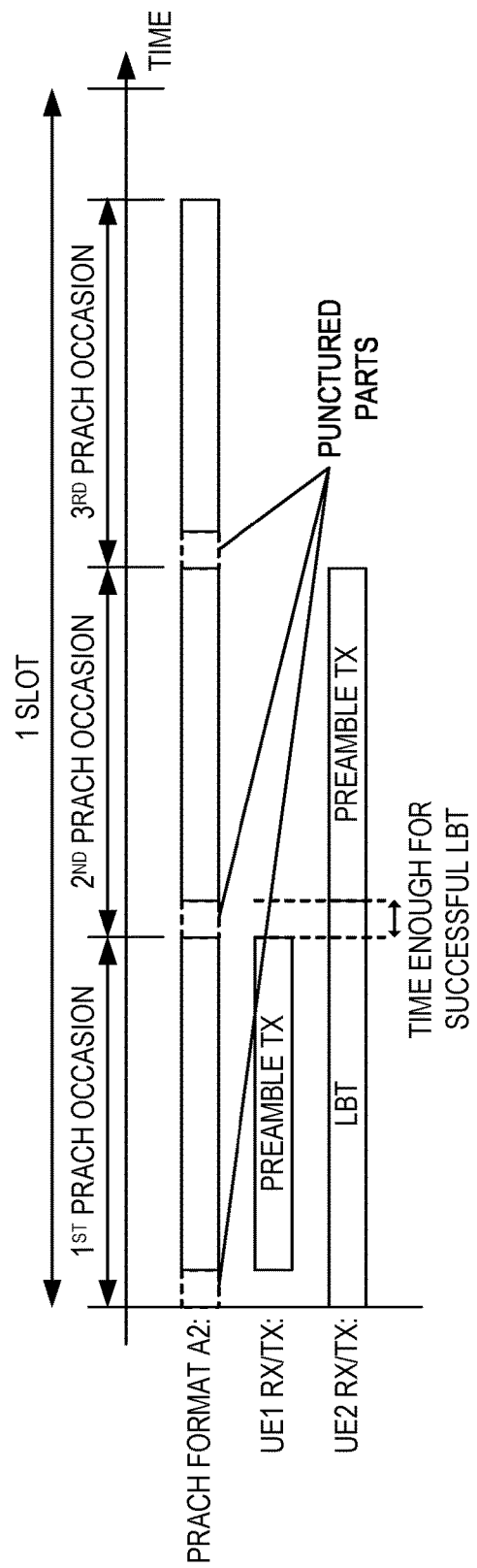

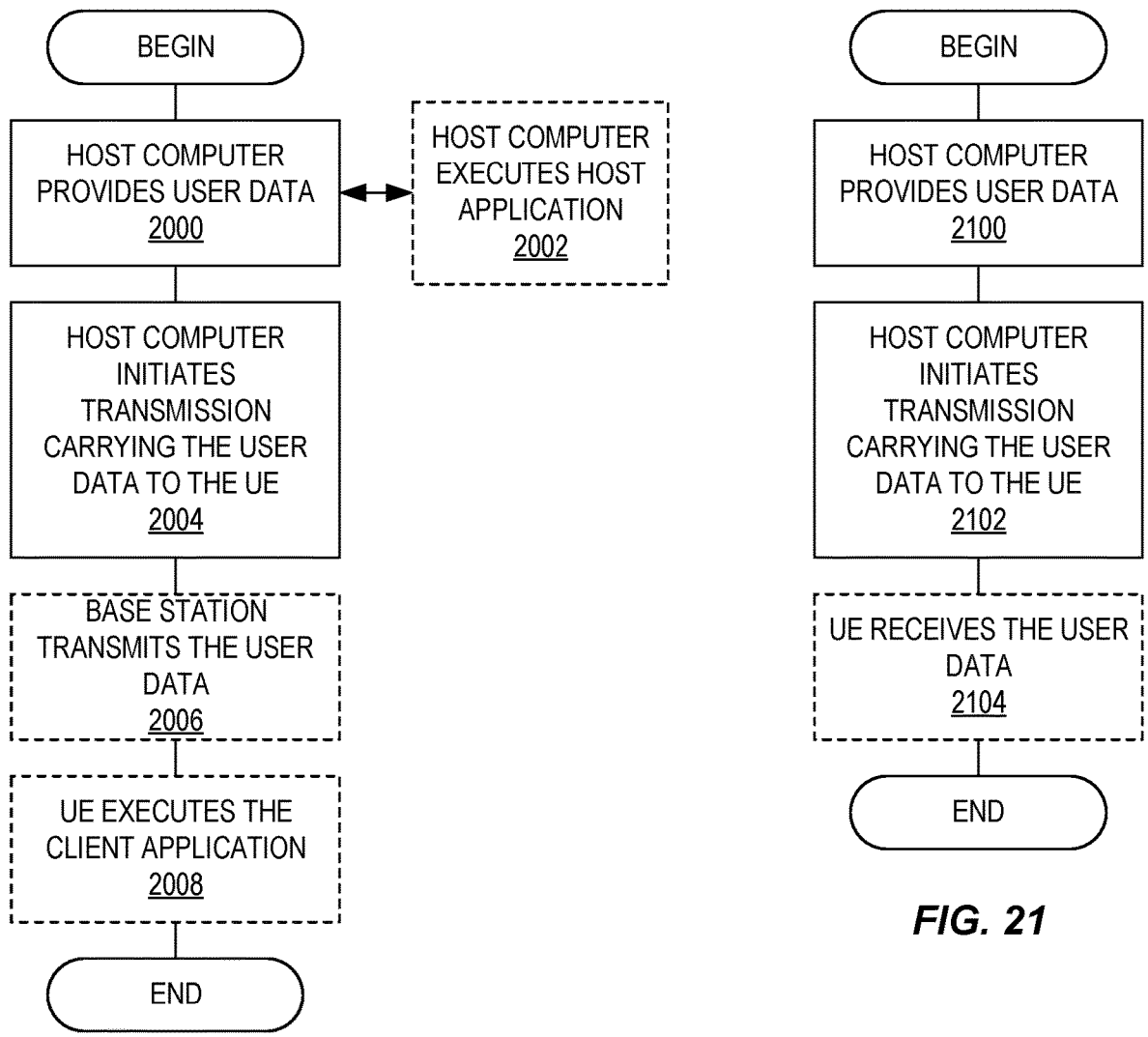

METHOD FOR ACCESSING A CELLULAR COMMUNICATIONS NETWORK IN UNLICENSED SPECTRUM

This application is a 35 U.S.C. § 371 national phase filing of International Application No. PCT/EP2020/062172, filed Apr. 30, 2020, which claims the benefit of U.S. Provisional Application No. 62/842,610, filed May 3, 2019 the disclosures of which are incorporated herein by reference in their entireties.

TECHNICAL FIELD

The technology of the disclosure relates generally to accessing a cellular communications network, such as a New Radio (NR) network, in unlicensed spectrum.

BACKGROUND

New Radio (NR) standard in Third Generation Partnership Project (3GPP) is being designed to provide service for multiple use cases such as enhanced Mobile Broadband (eMBB), Ultra-Reliable and Low Latency Communication (URLLC), and Machine Type Communication (MTC). Each of these services has different technical requirements. For example, the general requirement for eMBB is a high data rate with moderate latency and moderate reliability, while URLLC service requires a low latency and high reliability transmission but perhaps for moderate data rates.

One of the solutions for low latency data transmission is to shorten transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service, meaning that a mini-slot may be used for either eMBB, URLLC, or other services.

FIG. 1 illustrates an exemplary radio resource in NR.

Resource Blocks (RBs)

In Release 15 NR, a User Equipment (UE) can be configured with up to four carrier bandwidth parts in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can in addition be configured with up to four carrier bandwidth parts in the supplementary uplink with a single supplementary uplink carrier bandwidth part being active at a given time.

For a carrier bandwidth part with a given numerology $\mu_i$, a contiguous set of Physical Resource Blocks (PRBs) are defined and numbered from 0 to $N_{BWP,i}^{size}-1$, where i is the index of the carrier bandwidth part. An RB is defined as 12 consecutive subcarriers in the frequency domain.

Numerologies

Multiple OFDM numerologies, $\mu$, are supported in NR as given by Table 1, where the subcarrier spacing, $\Delta f$, and the cyclic prefix for a carrier bandwidth part are configured by different higher layer parameters for downlink and uplink, respectively.

TABLE 1

| Supported transmission numerologies | | |
|---|---|---|
| $\mu$ | $\Delta f = 2^\mu \cdot 15 \{kHz\}$ | Cyclic prefix |
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:
  Physical Downlink Shared Channel, PDSCH;
  Physical Broadcast Channel, PBCH; and
  Physical Downlink Control Channel, PDCCH.

PDSCH is a main physical channel used for unicast downlink data transmission, and for transmission of Radio Access Response (RAR), certain system information blocks, and paging information. PBCH carries basic system information required by the UE to access the network. PDCCH is used for transmitting Downlink Control Information (DCI), which contains mainly scheduling information required for reception of the PDSCH and uplink scheduling grants enabling transmission on a Physical Uplink Shared Channel (PUSCH).

An uplink physical channel corresponds to a set of resource elements carrying information originating from higher layers. The following uplink physical channels are defined:
  Physical Uplink Shared Channel, PUSCH;
  Physical Uplink Control Channel, PUCCH; and
  Physical Random Access Channel, PRACH.

PUSCH is the uplink counterpart to the PDSCH. PUCCH is used by UEs to transmit uplink control information, including Hybrid Automatic Repeat Request (HARQ) acknowledgements, Channel State Information (CSI) reports, etc. PRACH is used for random access preamble transmission.

Cell Search and Initial Access Related Channels and Signals

For cell search and initial access, Synchronization Signal (SS) and Physical Broadcast Channel (PBCH) (denoted SS/PBCH) block, PDSCH carrying Remaining Minimum System Information (RMSI)/RAR/MSG4 scheduled by PDCCH channels carrying DCI, PRACH channels and PUSCH channel carrying MSG3 are used.

The SS/PBCH block, or SSB in shorter format, includes Primary Synchronization Signal (PSS), Secondary Synchronization Signal (SSS), PBCH Demodulation Reference Signal (DMRS), and PBCH. SSB may have 15 kHz, 30 kHz, 120 kHz, or 240 kHz Subcarrier Spacing (SCS) depending on the frequency range.

NR-Unlicensed (NR-U)

NR-Unlicensed (NR-U) is specified in 3GPP to bring NR to the unlicensed bands. Two requirements are commonly found in regulations for operation in unlicensed spectrum: (1) occupied channel bandwidth, and (2) maximum Power Spectral Density (PSD). The occupied channel bandwidth requirement states that the transmitted signal power needs to occupy a large portion of the declared Nominal Channel Bandwidth, e.g., at least 80% of a nominal 20 MHz channel bandwidth. Maximum PSD requirements exist in many different regions, e.g., 10 dBm/MHz. The implication of the maximum PSD requirement is that, without a proper physical layer signal design, a signal with small transmission bandwidth will be limited in transmission power. This can negatively affect coverage.

One possible solution to meet the occupied channel bandwidth and the maximum PSD requirements is to introduce frequency domain interlaced transmissions in the Uplink (UL), i.e. spreading multiple PRBs over the available bandwidth that is used. Alternatively, legacy (Release 15 NR) frequency domain allocation based on contiguous PRBs may be repeated in the frequency domain to enable higher total transmission power while still satisfying the PSD constraint. The PRACH signal transmitted by the UE in the UL is one such signal that can benefit from increased total transmit power since the PRACH signal defines UL coverage of a cell operating in unlicensed spectrum.

Listen Before Talk (LBT) for Operation in Unlicensed Spectrum

For a network node (e.g., NR-U gNB/UE, LTE-LAA eNB/UE, or WiFi AP/STA)) to be allowed to transmit in unlicensed spectrum (e.g., 5 GHz band), the radio node typically needs to perform a Clear Channel Assessment (CCA), which is often referred to as Listen Before Talk (LBT). LBT typically includes sensing the medium to be idle for a number of time intervals before starting to transmit on the medium. Sensing the medium to be idle can be done in different ways, e.g., using energy detection, preamble detection, or virtual carrier sensing. Notably, virtual carrier sensing implies that the radio node reads control information from other transmitting radio nodes that indicates when a transmission by the other transmitting radio nodes will end. After sensing the medium to be idle, the radio node is typically allowed to transmit for a certain amount of time, sometimes referred to as Transmission Opportunity (TXOP). The length of the TXOP depends on regulation and type of CCA that has been performed, but typically ranges from 1 millisecond (ms) to 10 ms. This duration is often referred to as a Channel Occupancy Time (COT).

In Wi-Fi, feedback of data reception acknowledgements (ACKs) is transmitted without performing clear channel assessment. Preceding the feedback transmission, a small time duration (called Short Interframe Space (SIFS)), which does not include actual sensing of the channel, is introduced between the data transmission and the corresponding feedback. In 802.11, the SIFS period (e.g., 16 µs for 5 GHz OFDM PHYs) is defined as:

*aSIFSTime* =

$aRxPHYDelay + aMACProcessingDelay + aRxTxTurnaroundTime$ aRxPHYDelay defines the duration needed by the Physical (PHY) layer to deliver a packet to the Medium Access Control (MAC) layer aMACProcessingDelay defines the duration that the MAC layer needs to trigger the PHY layer transmitting a response aRxTxTurnaroundTime defines the duration needed to turn the radio from reception into transmit mode Therefore, the SIFS duration is used to accommodate for the hardware delay to switch from reception to transmission.

It is anticipated that for NR-U, a similar gap as the SIFS will be allowed to accommodate for the radio turnaround time. For example, the gap will enable a UE to transmit the PUCCH carrying Uplink Control Information (UCI) feedback, the PUSCH carrying data, and possibly the UCI within a same TXOP acquired by the initiating gNB without the UE having to perform the CCS before transmitting the PUSCH/PUCCH, as long as the gap between Downlink (DL) and UL transmission is less than or equal to 16 µs. Operation in this manner is typically called "COT sharing."

FIG. 2 illustrates a TXOP with and without COT sharing after a successful CCA at a gNB. For the case of COT sharing, the gap between DL and UL transmission is less than 16 µs. Different categories of CCA or LBT have been defined for operation in unlicensed spectrum. In the COT sharing scenario where the gap between DL and UL is <16 µs, Cat1 LBT is used. Cat 1 LBT is defined as immediate transmission allowed, i.e., no LBT is performed. In contrast, in the COT sharing scenario, if the gap is greater than 25 µs, then a minimum of Cat2 LBT must be used by the UE instead of Cat1. Cat2 LBT is defined as a CCA where the medium is sensed during a fixed 25 µs period prior to transmission. If the channel is clear, then the initiating node transmits. Cat2 is also used in scenarios other than COT sharing, e.g., when the gNB initiates a COT for transmission of a Discovery Reference Signal (DRS). Cat2 LBT is used in Long-Term Evolution (LTE) Licensed Access Assisted (LAA) (LTE-LAA) for DRS transmissions, and for transmission of DRS in NR as long as the DRS duration is <1 ms and the DRS periodicity is 20 ms or greater. Cat2 LBT is sometimes referred to as single-shot LBT.

Cat4 LBT is used by an initiating node in a majority of channel access scenarios. With Cat4 LBT, the initiating node randomly draws a starting value for a back-off counter between 0 and the contention window size $CW_p$. The initial contention window size ($CW_{min,p}$) depends on a channel access priority class (see Table 4.1.1-1 from 37.213 v.15.2.0 below). Generally, a smaller initial contention window size is used for traffic with higher priority (lower priority class value). Under Cat4 LBT, a UE performs CCA each 9 µs and, when the medium is sensed to be idle, the back-off counter is decremented by 1. Once the back-off counter reaches zero and a final CCA is successful, the node may transmit. If the final CCA is unsuccessful, the UE repeats the above process by drawing a new random value for the back-off counter. Once transmission is finally allowed to occur, and if the initiating node later receives a feedback (e.g., PDSCH/PUSCH HARQ feedback) indicating that a transmission is unsuccessful, e.g., due to a collision with another node's transmission, the contention window size $CW_p$ is increased (roughly doubled) for the next transmission by that node. For a given channel access priority class, a range of possible values for $CW_p$ is defined between $CW_{min,p}$ and $CW_{max,p}$ so that the contention window does not grow without bound each time the contention window is doubled. For example, for priority class 1, the allowed values of $CW_p$, are only 3 and 7.

TABLE 4.1.1-1

Channel Access Priority Class

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

PRACH Formats in NR

The PRACH formats supported in NR Release 15 are illustrated in FIG. 3. PUSCH is also illustrated for reference. All formats includes a Zadoff-Chu sequence s that is repeated one or multiple times without Cyclic Prefix (CP) in between repetitions (only a CP at the very beginning of the preamble). Note that the Bx formats have small guard periods at the end, and Cx formats have somewhat larger guards. For NR-U, primarily the short-sequence formats (L=139) are of interest. For these formats, multiple preambles can generally be time-multiplexed in a single slot as illustrated in FIG. 4. PUSCH is also illustrated for reference. Note that FIG. 4 only shows example allocations within a slot. The actual allocation (configuration) to use is determined by the PRACH configuration table discussed in the following section. Note that PRACH occasions can also be multiplexed in the frequency domain, which is not discussed in the present disclosure. Also note that the term "PRACH occasion" in the present disclosure generally refers to a "time-domain PRACH occasion" (i.e. one PRACH transmission time instance, which may then potentially contain several frequency-multiplexed PRACH occasions in the proper sense of the term). Further, currently the term "PRACH occasion" (in Release 15) seems to include a guard period at the end of the PRACH occasion in some instances (within the Release 15 standards) but not in some other instances (within the Release 15 standards). As used herein, the term "PRACH occasion" or "random access occasion" will include any guard or gap, unless otherwise explicitly stated.

PRACH Configuration in NR

As mentioned above, transmission of the PRACH by the UE is used for UEs in IDLE and INACTIVE modes to gain access to the system. PRACH transmissions are also used for UEs in CONNECTED and INACTIVE modes to re-align UL timing and potentially for scheduling requests. For NR-U, the PRACH transmissions can use Cat4 LBT with the lowest channel access priority class value (Class 1), in which the smallest contention window size is 3 and the largest contention window size is 7. This priority class value is used since PRACH is a critical control signal with high priority.

In NR Release 15, specific time/frequency locations (called PRACH occasions) are configured so that the UE knows when to transmit PRACH and the gNB knows when to listen for PRACH transmitted by UEs attempting to gain access to the system. In 3GPP 38.211 v 15.4.0, large tables (256 rows) of possible PRACH configurations are specified. As an example, PRACH Configuration Index 129 (Row 129) from Table 6.3.3.2-3 for frequency range 1 (FR1) in unpaired (TDD) spectrum is given by the following

TABLE 6.3.3.2-3

Random access configurations for FR1 and unpaired spectrum.

| PRACH Configuration Index | Preamble format | $n_{SFN}$ mod x = y | | Subframe number | Starting symbol | Number of PRACH slots within a subframe | $N_t^{RA,\ slot}$, number of time-domain PRACH occasions within a PRACH slot | $N_{dur}^{RA}$, PRACH duration |
|---|---|---|---|---|---|---|---|---|
| | | x | y | | | | | |
| 129 | A2 | 1 | 0 | 4, 9 | 0 | 1 | 3 | 4 |

This configuration uses PRACH preamble format A2, which has a time duration (last column of the table) of 4 OFDM symbols. The values of x and y in the table specify that the PRACH configuration period is every x=1 radio frame (every 10 ms) with an offset of y=0 radio frame from the boundary of radio frame 0 (SFN 0). The subframe numbers in the table specify that PRACH occasions appear in subframes 4 and 9 of a radio frame. Since a subframe (1 ms) may include a different number of slots depending on the numerology, there is a column that specifies how many slots of the subframe contain PRACH occasions (in this case, just 1). The remaining two columns specify the starting OFDM symbol of the first PRACH occasion within a slot and how many consecutive (back-to-back) PRACH occasions occur in the slot. In this example, the first PRACH occasion starts at OFDM symbol 0 and there are $N_t^{RA,slot}=3$ back-to-back PRACH occasions in the slot. In Release 15 NR, all PRACH configurations consisting of multiple PRACH occasions in a slot effectively are back-to-back without gaps, except format C2, which does have gaps. Note that Formats Bx and C0 also have gaps, but the gaps are too short for LBT, especially for subcarrier spacing 30 kHz or larger. FIG. 5 illustrates the time domain configuration for this example. In other words, FIG. 5 illustrates a PRACH configuration example showing back-to-back PRACH occasions in one slot.

PRACH Configurations for NR-U

For NR-U, back-to-back PRACH occasions can cause problems in unlicensed spectrum where LBT is required. More specifically, a UE transmitting in PRACH occasion N in a slot could block other UEs from transmitting in PRACH occasion N+1 because, after the other UE(s) performed the necessary successful LBT, the starting time of PRACH occasion N+1 has already passed, and the other UE(s) would have to wait until PRACH occasion N+2. For example, if a UE transmits in the 1$^{st}$ PRACH occasion of a slot, then another UE would not be able to transmit in the 2$^{nd}$ PRACH occasion of the slot, as illustrated in FIG. 6. Hence, PRACH occasion N+1 (and in general every second PRACH occasion) would risk becoming unused, causing unnecessary reductions of spectrum utilization and introducing unnecessary delays in the system.

Therefore, for NR-U it has been proposed to update the RACH configuration table to incorporate configurations where preambles are not back-to-back. This can be achieved by increasing the number in the last column (e.g., from 4 to 5 in the above example) so that the time interval between consecutive preambles within a slot becomes larger. Note that the actual transmission duration of the preamble (4 OFDM symbols in case of format A2) would remain the same based on the definition of the preamble format in Tables 6.3.3.1-1 and 6.3.3.1-2 of 3GPP TS 38.211. Accordingly, the increased time interval would result in a guard (gap) at end of the preamble (of 1 OFDM symbol in the above example).

SUMMARY

Embodiments disclosed herein include a method for accessing a cellular communications network in unlicensed spectrum. More specifically, the method is related to performing a Listen-Before-Talk (LBT) procedure prior to transmitting a Physical Random Access Channel (PRACH) preamble for accessing a New Radio-Unlicensed (NR-U) network. To access the cellular communications network, a User Equipment (UE) first performs the LBT procedure. If the LBT procedure is successful, the UE then generates a punctured PRACH preamble and transmits the punctured PRACH preamble. In a non-limiting example, the UE can puncture at a beginning and/or an end of the PRACH preamble. By puncturing the PRACH preamble, it is possible to create a gap(s) for performing the LBT procedure in a way that is backward compatible with existing NR-U specification and does not reduce the number of random access occasions in a slot or a mini-slot. As a result, it is possible to transmit PRACH preambles in consecutive random access occasions, thus helping to increase spectrum utilization and reduce latency in the cellular communications network.

In one embodiment, a method is performed by a wireless device for accessing a cellular communications network in unlicensed spectrum. The method comprising: performing an LBT procedure during any of two or more back-to-back random access occasions; responsive to a success of the LBT procedure: generating a punctured random access preamble; and transmitting the punctured random access preamble if the LBT procedure is successful.

In another embodiment, performing the LBT procedure comprises performing the LBT procedure during a first of the two or more back-to-back random access occasions; and transmitting the punctured random access preamble comprises transmitting the punctured random access preamble in a second of the two or more back-to-back random access occasions succeeding the first of the two or more back-to-back random access occasions, responsive to the success of the LBT procedure.

In another embodiment, performing the LBT procedure comprises: performing the LBT procedure during a first random access occasion of the two or more back-to-back random access occasions, wherein the LBT procedure fails during the first random access occasion; and performing the LBT procedure at a beginning portion of a second random access occasion of the two or more back-to-back random access occasions that succeeds the first random access occasion, wherein the LBT procedure succeeds during the beginning portion of the second random access occasion; and generating the punctured random access preamble comprises generating the punctured random access preamble responsive to the success of the LBT procedure during the beginning portion of the second random access occasion; and transmitting the punctured random access preamble comprises transmitting the punctured random access preamble in the second random access occasion starting after the beginning portion of the second random access occasion in which the LBT procedure was performed.

In another embodiment, performing the LBT procedure comprises performing the LBT procedure during any one of the two or more back-to-back random access occasions; and transmitting the punctured random access preamble comprises transmitting the punctured random access preamble in the any one of the two or more back-to-back random access occasions.

In another embodiment, transmitting the punctured random access preamble comprises transmitting the punctured random access preamble in one of the two or more back-to-back random access occasions.

In another embodiment, transmitting the punctured random access preamble comprises transmitting the punctured random access preamble in one of the two or more back-to-back random access occasions such that the punctured random access preamble creates a gap between the one of the two or more back-to-back random access occasions and at least one other of the two or more back-to-back random access occasions.

In another embodiment, transmitting the punctured random access preamble comprises transmitting the punctured random access preamble in an Nth random access occasion from among the two or more back-to-back random access occasions such that the punctured random access preamble creates a gap between the Nth random access occasion and either or both of: an (N−1)th random access occasion immediately preceding the Nth random access occasion and an (N+1)th random access occasion immediately succeeding the Nth random access occasion, from among the two or more back-to-back random access occasions.

In another embodiment, the punctured random access preamble is punctured at a beginning or an end of the corresponding random access preamble based on estimated tendency of a propagation delay. In another embodiment, the punctured random access preamble is punctured at the beginning of the corresponding random access preamble under one or more of the following conditions: the wireless device performs random access for a purpose not related to handover; a receive power of a pilot signal is higher than a defined power threshold; a path loss is lower than a defined path loss threshold; a last used Timing Advance (TA) is lower than a defined TA threshold; a coverage cell having a coverage size smaller than a defined cell size threshold; a distance between the wireless device and an antenna site of a network node receiving uplink transmissions in a cell in which the random access preamble is transmitted is shorter than a defined threshold; and a propagation delay is lower than a defined delay threshold.

In another embodiment, the punctured random access preamble is punctured at the end of the corresponding random access preamble under one or more of the following conditions: the wireless device performs handover; a receive power of a pilot signal is lower than a defined power threshold; a path loss is higher than a defined path loss threshold; a last used TA is higher than a defined TA threshold; a coverage cell has a coverage size larger than a defined cell size threshold; a distance between the wireless device and an antenna site of a network node receiving uplink transmissions in a cell in which the random access preamble is transmitted is greater than a defined threshold; and a propagation delay is higher than a defined delay threshold.

In another embodiment, the punctured random access preamble is generated such that there is a full Zadoff-Chu sequence at the end of the punctured random access preamble.

In another embodiment, the punctured random access preamble is a version of a corresponding random access preamble that is punctured at both a beginning and an end of the corresponding random access preamble.

In another embodiment, the punctured random access preamble is adapted to create a puncturing gap at a beginning and/or an end of a respective one of the two or more back-to-back random access occasions.

In another embodiment, a duration of the puncturing gap is predefined.

In another embodiment, a duration of the puncturing gap is configured by a network node.

In another embodiment, a duration of the puncturing gap is a function of one or more of the following parameters: random access channel format; frequency band; and random access channel subcarrier spacing.

In another embodiment, a duration of the puncturing gap is a function of one or more of the following parameters: estimated network load; predicted network load; and measured network load.

In another embodiment, a duration of the puncturing gap is a function of one or more of the following parameters: estimated propagation delay; predicted propagation delay; and measured propagation delay.

In another embodiment, a duration of the puncturing gap is adapted based on access priority of the wireless device.

In another embodiment, a duration of the puncturing gap is adapted based on an outcome of the LBT procedure.

In another embodiment, the duration of the puncturing gap is greater than or equal to a predefined or configured minimum gap size.

In another embodiment, the duration of the puncturing gap is less than or equal to a predefined or configured maximum gap size.

In another embodiment, the duration of the puncturing gap is one of a number of predefined or configured possible gap sizes.

In another embodiment, generating the punctured random access preamble comprises determining whether to puncture a corresponding random access preamble at a beginning of the corresponding random access preamble or at an end of the corresponding random access preamble, to provide the punctured random access preamble, based on one or more parameters related to propagation delay.

In another embodiment, the punctured random access preamble comprises transmitting the punctured random access preamble at a transmit power that compensates for a shortened duration of the punctured random access preamble as compared to a corresponding non-punctured random access preamble.

In another embodiment, transmitting the punctured random access preamble comprises transmitting the punctured random access preamble over a bandwidth that is wider than that used for transmitting a corresponding non-punctured random access preamble.

In another embodiment, the punctured random access preamble is a punctured PRACH preamble.

In another embodiment, the method further comprises: performing a second LBT procedure during a first random access occasion of a second set of two or more back-to-back random access occasions; generating a random access preamble without puncturing responsive to a success of the second LBT procedure prior to a start of a second random access occasion of the second set of two or more back-to-back random access occasions; and transmitting the random access preamble in the second random access occasion of the second set of two or more back-to-back random access occasions.

In another embodiment, the two-or-more back-to-back random access occasions are separated by a gap substantially less than a symbol duration.

In another embodiment, the method further comprises: providing user data; and forwarding the user data to a host computer via the transmission to the base station.

In another embodiment, a wireless device is provided. The wireless device comprises: a radio unit configured to perform an LBT procedure during any of two or more back-to-back random access occasions; and a control system configured to: generate a punctured random access preamble responsive to a success of the LBT procedure; and transmit the punctured random access preamble if the LBT procedure is successful.

In another embodiment, the wireless device is further configured to perform any one of embodiments in the method performed by the wireless device.

In another embodiment, a method performed by a base station is provided. The method comprises: detecting a punctured random access preamble transmitted by a wireless device in unlicensed spectrum; and in response, transmitting a random access response to the wireless device.

In another embodiment, detecting the punctured random access preamble comprises detecting the punctured random access preamble in one of two or more back-to-back random access occasions. In another embodiment, detecting the punctured random access preamble comprises detecting the punctured random access preamble in one of two or more back-to-back random access occasions such that the punctured random access preamble creates a gap between the one of the two or more back-to-back random access occasions and at least one other of the two or more random access occasions. In another embodiment, detecting the punctured random access preamble comprises detecting the punctured random access preamble in an Nth random access occasion from among two or more back-to-back random access occasions such that the punctured random access preamble creates a gap between the Nth random access occasion and either or both of: an (N−1)th random access occasion immediately preceding the Nth random access occasion and an (N+1)th random access occasion immediately succeeding the Nth random access occasion, from among the two or more back-to-back random access occasions.

In another embodiment, the punctured random access preamble is a version of a corresponding random access preamble that is punctured at a beginning of the corresponding random access preamble.

In another embodiment, the punctured random access preamble is a version of a corresponding random access preamble that is punctured at an end of the corresponding random access preamble.

In another embodiment, the punctured random access preamble is such that there is a full Zadoff-Chu sequence at an end of the punctured random access preamble.

In another embodiment, the punctured random access preamble is a version of a corresponding random access preamble that is punctured at both a beginning and an end of the corresponding random access preamble.

In another embodiment, the punctured random access preamble is adapted to create a puncturing gap at a beginning and/or an end of a respective one of the two or more back-to-back random access occasions.

In another embodiment, a duration of the puncturing gap is predefined.

In another embodiment, the method further comprises sending, to the wireless device, a configuration of a duration of the puncturing gap.

In another embodiment, a duration of the puncturing gap is a function of one or more of the following parameters: random access channel format; frequency band; and random access channel subcarrier spacing.

In another embodiment, a duration of the puncturing gap is a function of one or more of the following parameters: estimated network load; predicted network load; and measured network load.

In another embodiment, a duration of the puncturing gap is a function of one or more of the following parameters: estimated propagation delay; predicted propagation delay; and measured propagation delay.

In another embodiment, a duration of the puncturing gap is adapted based on access priority of the wireless device.

In another embodiment, detecting the punctured random access preamble comprises detecting the punctured random access preamble over a bandwidth that is wider than that used for a corresponding non-punctured random access preamble.

In another embodiment, the punctured random access preamble is a punctured PRACH preamble.

In another embodiment, the method further comprises: obtaining user data; and forwarding the user data to a host computer or the wireless device.

In another embodiment, a base station comprising: a radio unit configured to detect a punctured random access preamble transmitted by a wireless device in unlicensed spectrum; and a control system configured to, in response, transmit a random access response to the wireless device.

In another embodiment, the base station is further configured to perform any one of embodiments in the method performed by the base station.

In another embodiment, a computer program comprising instructions which, when executed on at least one processor, cause the at least one processor to carry out any one of embodiments in the method performed by the wireless device.

In another embodiment, a computer program comprising instructions which, when executed on at least one processor, cause the at least one processor to carry out any one of embodiments in the method performed by the base station.

In another embodiment, a carrier containing the computer program of the previous embodiment, wherein the carrier is one of an electronic signal, an optical signal, a radio signal, or a computer readable storage medium.

In another embodiment, a non-transitory computer readable medium storing software executable by processing circuitry of a wireless device whereby the wireless is operable to: perform an LBT procedure during any of two or more back-to-back random access occasions; generate a punctured random access preamble responsive to a success of the LBT procedure; and transmit the punctured random access preamble if the LBT procedure is successful.

In another embodiment, a non-transitory computer readable medium storing software executable by processing circuitry of a base station whereby the wireless is operable to: detect a punctured random access preamble transmitted by a wireless device in unlicensed spectrum; and a control system configured to, in response, transmit a random access response to the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 illustrates an example of PRACH preamble puncturing at an end of a PRACH preamble for accessing the cellular communications system of FIG. 8;

FIG. 10 illustrates an example of PRACH preamble puncturing at a beginning of a PRACH preamble for accessing the cellular communications system of FIG. 8;

FIG. 20 is a flowchart illustrating a method implemented in a communication system in accordance with one embodiment of the present disclosure;

FIG. 21 is a flowchart illustrating a method implemented in a communication system in accordance with one embodiment of the present disclosure;

DETAILED DESCRIPTION

Figure 1:
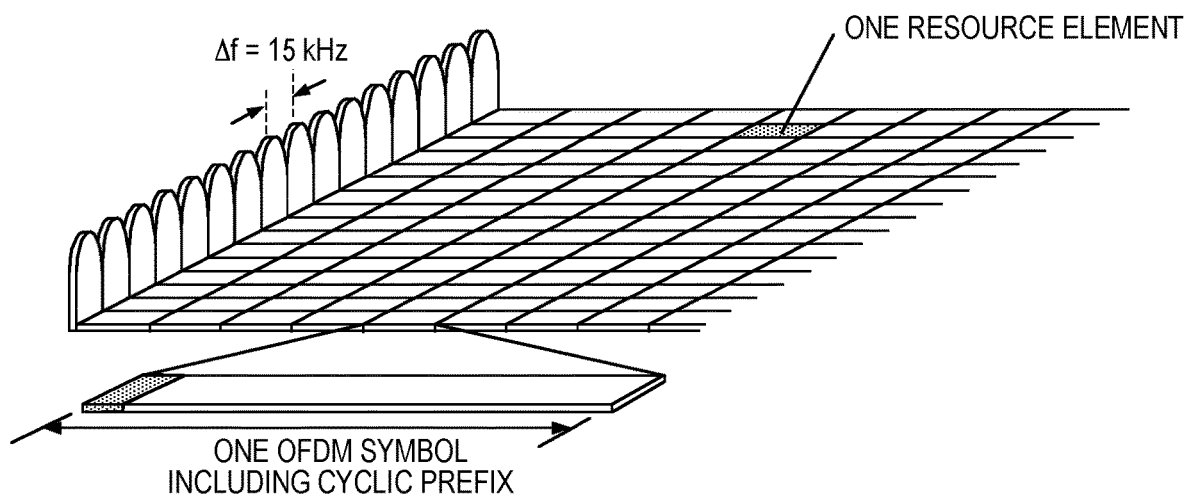
FIG. 1 illustrates an exemplary radio resource in New Radio (NR)
Figure 2:
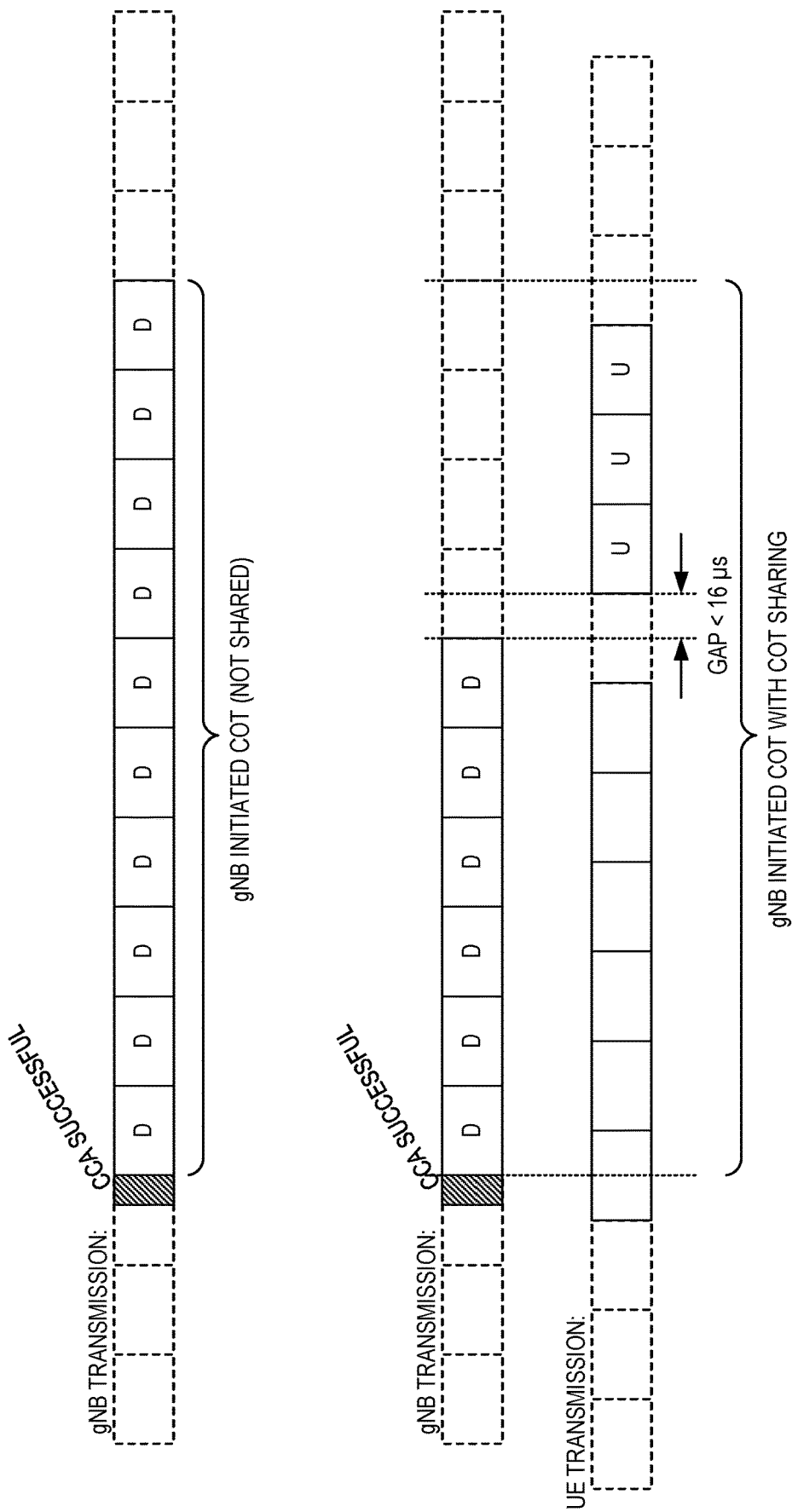
FIG. 2 illustrates an exemplary Transmission Opportunity (TXOP) with and without Channel Occupancy Time (COT) sharing after a successful Clear Channel Assessment (CCA) at a gNB.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Creating gaps between preambles through an updated RACH configuration table has several issues.

First, all rows of the RACH configuration table are already used for RACH configurations targeting Release 15 use cases. Modifying any row would thus reduce the flexibility for licensed spectrum where back-to-back preambles (or gaps<<1 symbol) are typically desired. Note that while the table may seem large (256 rows), it is responsible for configuring quite a number of parameters (one in each column). More precisely, 256 rows means 8 bits, about 4 of the 8 bits are effectively used to select which of the 13 Physical Random Access Channel (PRACH) formats to use, hence leaving effectively only about 4 bits for specifying the entries in the remaining 7 table columns. One could possibly extend the table for Release 16, or use different tables for licensed and unlicensed spectrum, but this would complicate specifications and timely completion of the specifications.

Figure 5:
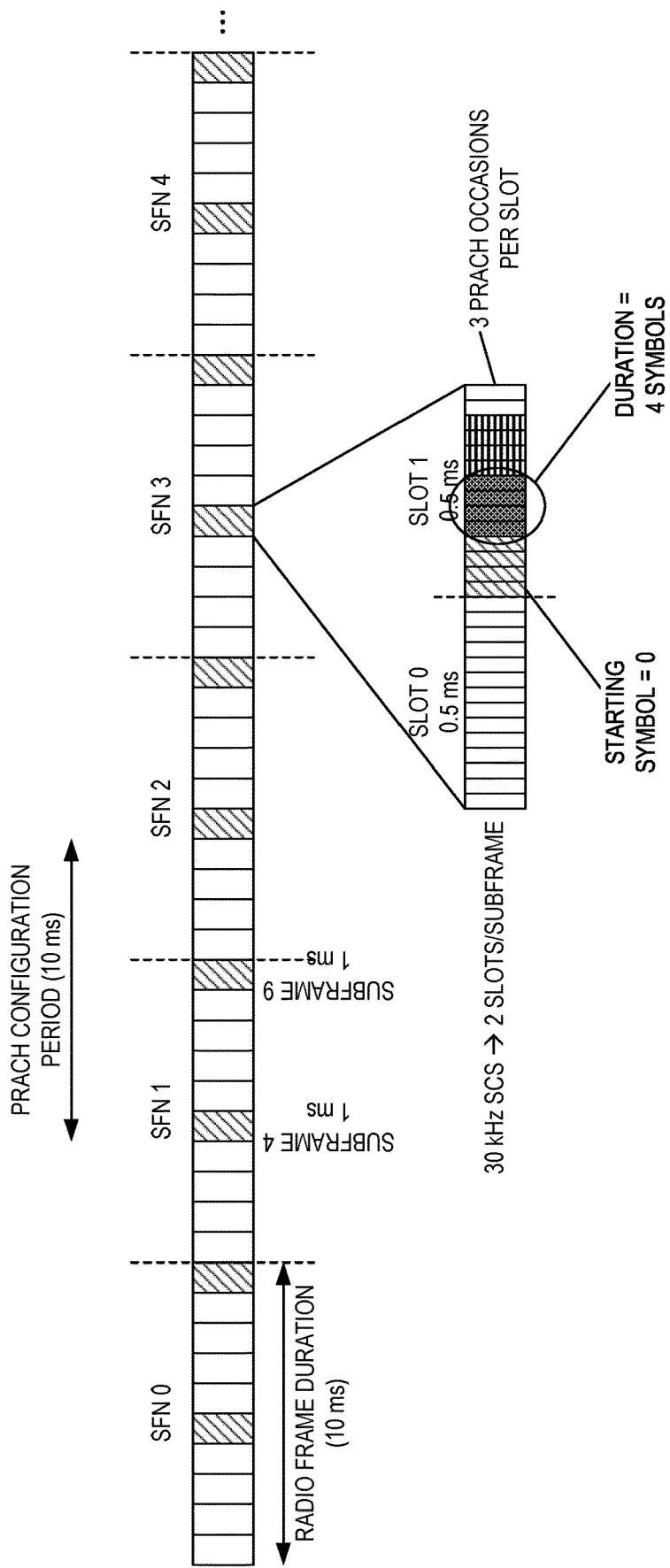
FIG. 5 illustrates an exemplary PRACH configuration having back-to-back PRACH occasions in one slot.
Figure 6:
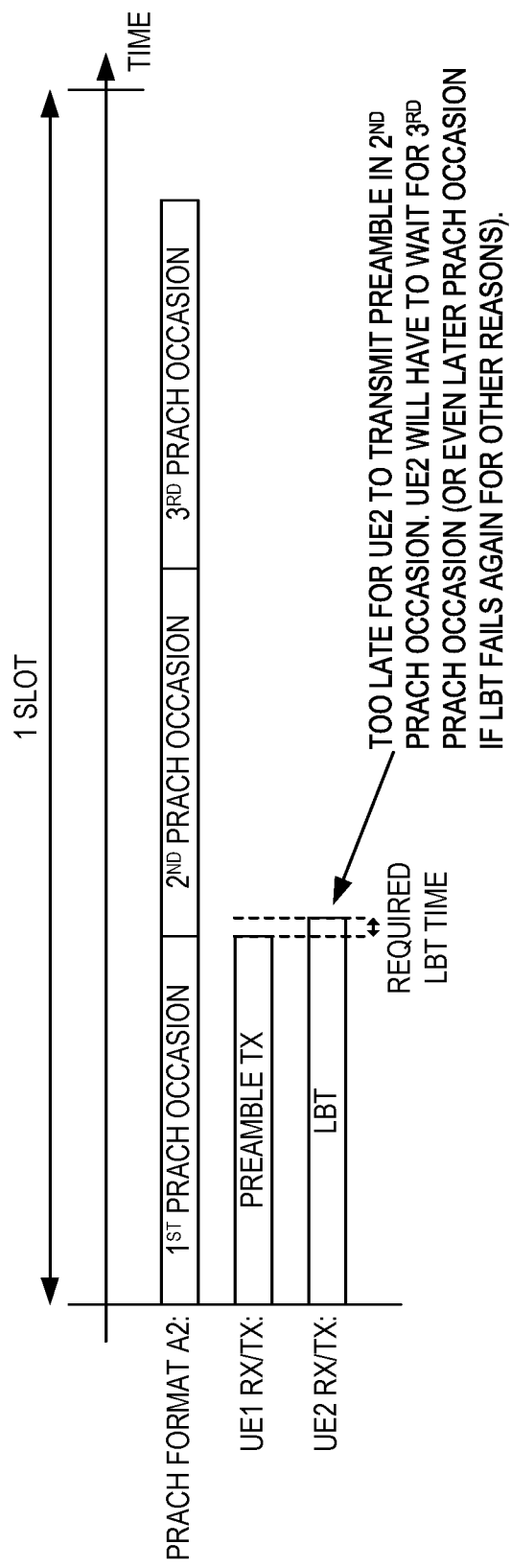
FIG. 6 illustrates an issue associated with performing Listen-Before-Talk (LBT) in back-to-back PRACH occasions in Release 15 NR.
Figure 7:
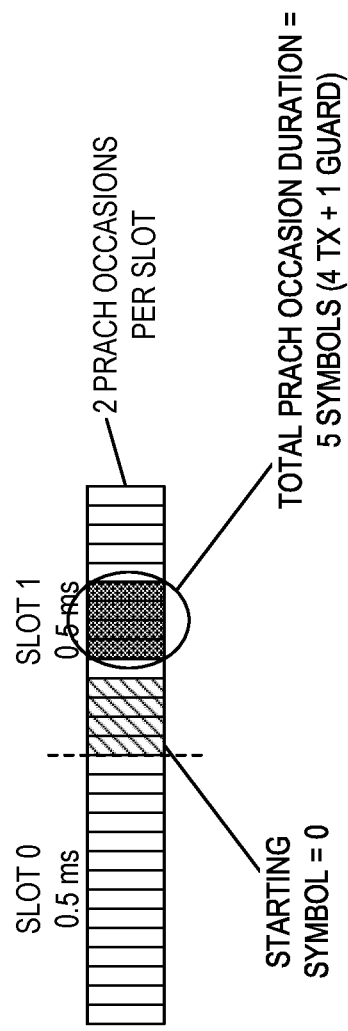
FIG. 7 illustrates an example problem with the Release 15 NR wherein a slot can only accommodate two PRACH occasions if a gap of one Orthogonal Frequency Division Multiplexing (OFDM) symbol is desired between format A2 preambles.

Second, the existing preamble formats are not generally well suited to configurations with gaps. For example, if a gap of 1 Orthogonal Frequency Division Multiplexing (OFDM) symbol is desired between format A2 preambles, then there would only be room for 2 PRACH occasions per slot as illustrated in FIG. 7 (compare with example above illustrated in FIG. 5). It might seem that there could be room for at least the four actually transmitted symbols of a third preamble, but then there would be no guard at all at the end of the slot, which is undesirable because it would cause interference into the next slot even for a small propagation delay. Although only the case of format A2 is illustrated here, similar situations occur for other formats. For example, for format A3, there are typically 2 PRACH occasions per slot in Release15. However, with 1 symbol gap, there is only room for 1 PRACH occasion per slot, thus wasting almost half the slot. Format C2 has a gap but is similar to format A2 and thus allows only 2 PRACH occasions per slot. Certain aspects of the present disclosure and embodiments can provide solutions to the aforementioned challenges. Embodiments are disclosed herein for introducing gaps between PRACH preambles (referred interchangeably as "preambles" hereinafter) by puncturing (e.g., refraining from transmitting) parts of the preambles. The puncturing may be at the end of the preamble, the beginning of the preamble, or both the beginning and end of the preamble. An example with puncturing at the end of each preamble can be seen in FIG. 9. By puncturing the beginning and/or the end of the preamble, it is possible perform a successful LBT after one preamble has been transmitted but before the next PRACH occasion.

The size of the gap (referred to herein as the puncturing duration) can be fixed (e.g., in the specifications) for each frequency band or signaled by the network. In some embodiments, the gap duration may to some extent be determined by the UE based on a Listen-Before-Talk (LBT) outcome.

There are, proposed herein, various embodiments that address one or more of the issues disclosed herein. Certain embodiments may provide one or more of the following technical advantage(s). Embodiments of the present disclosure allow for creation of gaps between preambles without modifying the RACH configuration tables, and without reducing the number of PRACH occasions in a slot. This allows consecutive PRACH occasions to be utilized for PRACH preamble transmission, and hence increased spectrum utilization and reduced latency in the system.

Figure 8:
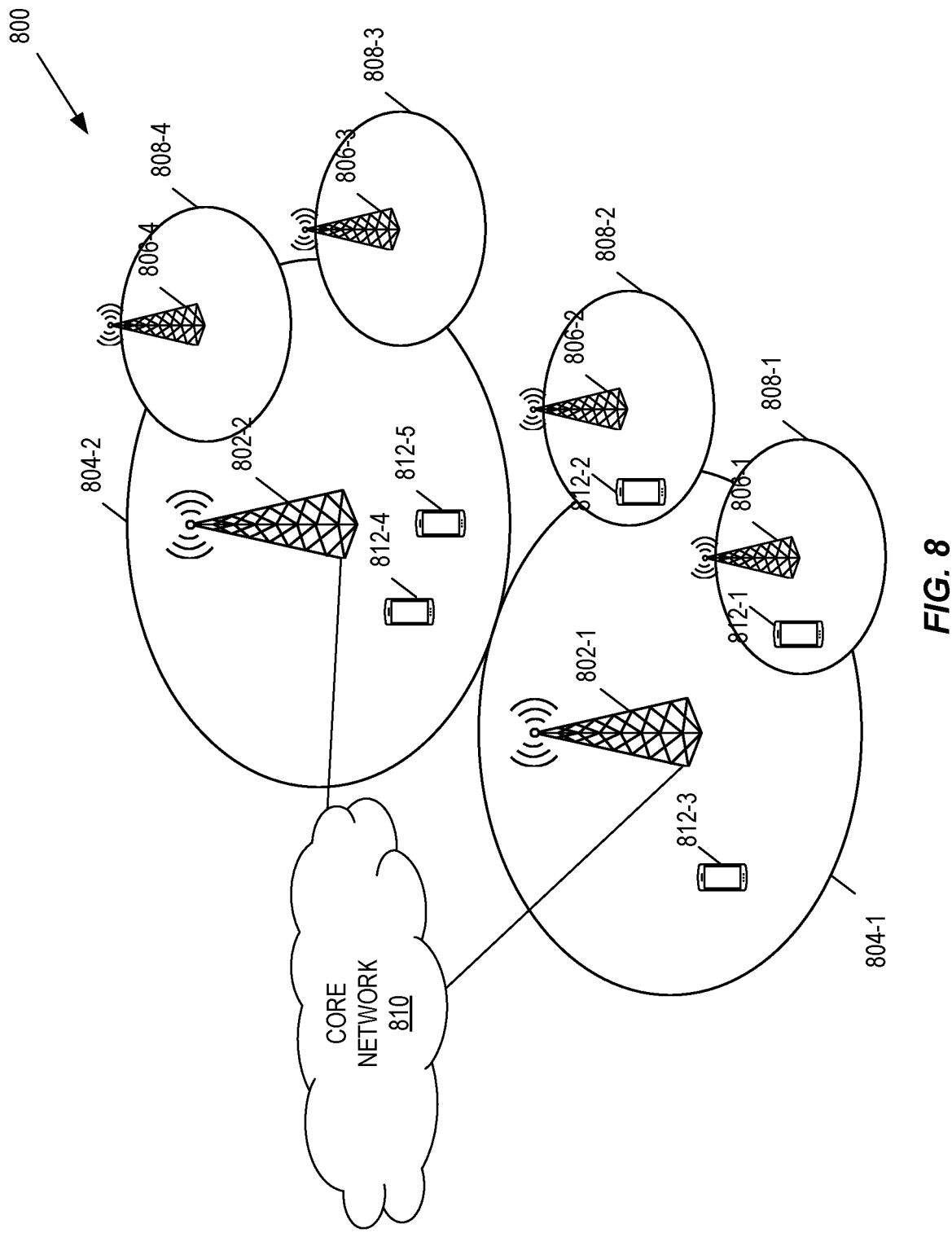
FIG. 8 illustrates one example of a cellular communications system in which embodiments of the present disclosure may be implemented.

In this regard, FIG. 8 illustrates one example of a cellular communications system 800 in which embodiments of the present disclosure may be implemented. In the embodiments described herein, the cellular communications system 800 is a 5G system (5GS) including a 5G NR Radio Access Network (RAN). In this example, the 5G NR RAN includes base stations 802-1 and 802-2, which in 5G NR are referred to as gNBs, controlling corresponding (macro) cells 804-1 and 804-2. The base stations 802-1 and 802-2 are generally referred to herein collectively as base stations 802 and individually as base station 802. Likewise, the (macro) cells 804-1 and 804-2 are generally referred to herein collectively as (macro) cells 804 and individually as (macro) cell 804. The cellular communications network 800 may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The cellular communications system 800 also includes a core network 810, which in the 5GS is referred to as the 5G core (5GC). The base stations 802 (and optionally the low power nodes 806) are connected to the core network 810.

The base stations 802 and the low power nodes 806 provide service to wireless devices 812-1 through 812-5 in the corresponding cells 804 and 808. The wireless devices 812-1 through 812-5 are generally referred to herein collectively as wireless devices 812 and individually as wireless device 812. The wireless devices 812 are also sometimes referred to herein as UEs.

Embodiments of the present disclosure introduce gaps between PRACH preambles by puncturing (e.g., refraining from transmitting) parts of the preambles. This allows for successful LBT after one preamble has been transmitted but before another preamble is transmitted in the next (e.g., immediately succeeding) PRACH occasion. The puncturing may be at the end of each preamble as illustrated in FIG. 9, or at the beginning as illustrated in FIG. 10. Further, it is also possible to puncture a preamble at the beginning and the end. Hereinafter, a "gap" will, unless otherwise stated or clear from context, refer to gaps created by puncturing.

The size of the gap (referred to herein as the puncturing duration) could be fixed (e.g., in the specifications) for each frequency band or signaled by the network. In some embodiments, the gap duration may to some extent be determined by the UE based on LBT outcome.

Note that in contrast to the case of introducing gaps through the RACH configuration tables as illustrated in FIG. 7, the number of PRACH occasions in a slot is not reduced. In addition, there is still a guard period at the end of the slot. This is due to the fact that the gap created by preamble puncturing only reduces each preamble transmission duration by an amount of time corresponding to the gap duration. However, the total duration of a PRACH occasion (including gap/guard time) is unchanged. Note also that no modification of the RACH configuration table(s) is needed.

An advantage of a gap at an end of each preamble is that it can automatically create a similar-sized gap at the end of a slot, thus preventing PRACH transmission from interfering with the next slot in case of long propagation delays. Analogously, an advantage of a gap at a beginning of each preamble is that it avoids the gNB from having to dynamically create a gap via scheduling, e.g., of PDSCH or PUSCH, prior to the first PRACH preamble occasion in the slot.

The gap duration can be universally fixed (e.g., in the 3GPP standards), or specified differently depending on other network configurations such as, for example, PRACH format, frequency band, and/or PRACH subcarrier spacing. The gap duration can also be signaled to the UE, for example, in SIB1 where RACH configuration is indicated for standalone or dual-connectivity deployments. Alternatively, the gap can be signaled by dedicated (e.g., RRC) signaling on a licensed carrier, for example, non-standalone (licensed assisted), deployments. This can be useful for Contention Based Random Access (CBRA) on SCells or PSCells in unlicensed spectrum. Puncturing duration can in principle also be signaled more dynamically (e.g., via PDCCH and/or handover command), since it is not crucial for all UEs in the cell to have the same puncturing duration all the time. Moreover, different puncturing for different UEs can be used as a means for adjusting PRACH priority between UEs, which is not possible with the RACH configuration table, adapting to PRACH/network load etc. Puncturing duration can be different for Contention-Free Random Access (CFRA) and CBRA, and/or be different for CONNECTED and IDLE mode.

In some embodiments, the gap duration (also referred to herein as the "gap size") is adaptable. Further, in some embodiments, the gap duration is adaptable based on LBT outcome. This embodiment is primarily applicable if the gap is at the beginning of the preamble (PRACH occasion). The idea is that the UE performs LBT until success, and then immediately (or after some small time interval, possibly configurable) starts transmission of the preamble. In this way, the preamble is punctured only until LBT success is achieved and the UE does not puncture the remaining part of the preamble. The advantage of this approach is that there is no risk that another node grabs the channel in the time period between LBT success and the end of a fixed-duration gap, in case LBT is completed and successful prior to the end of the fixed-duration gap.

Figure 11:
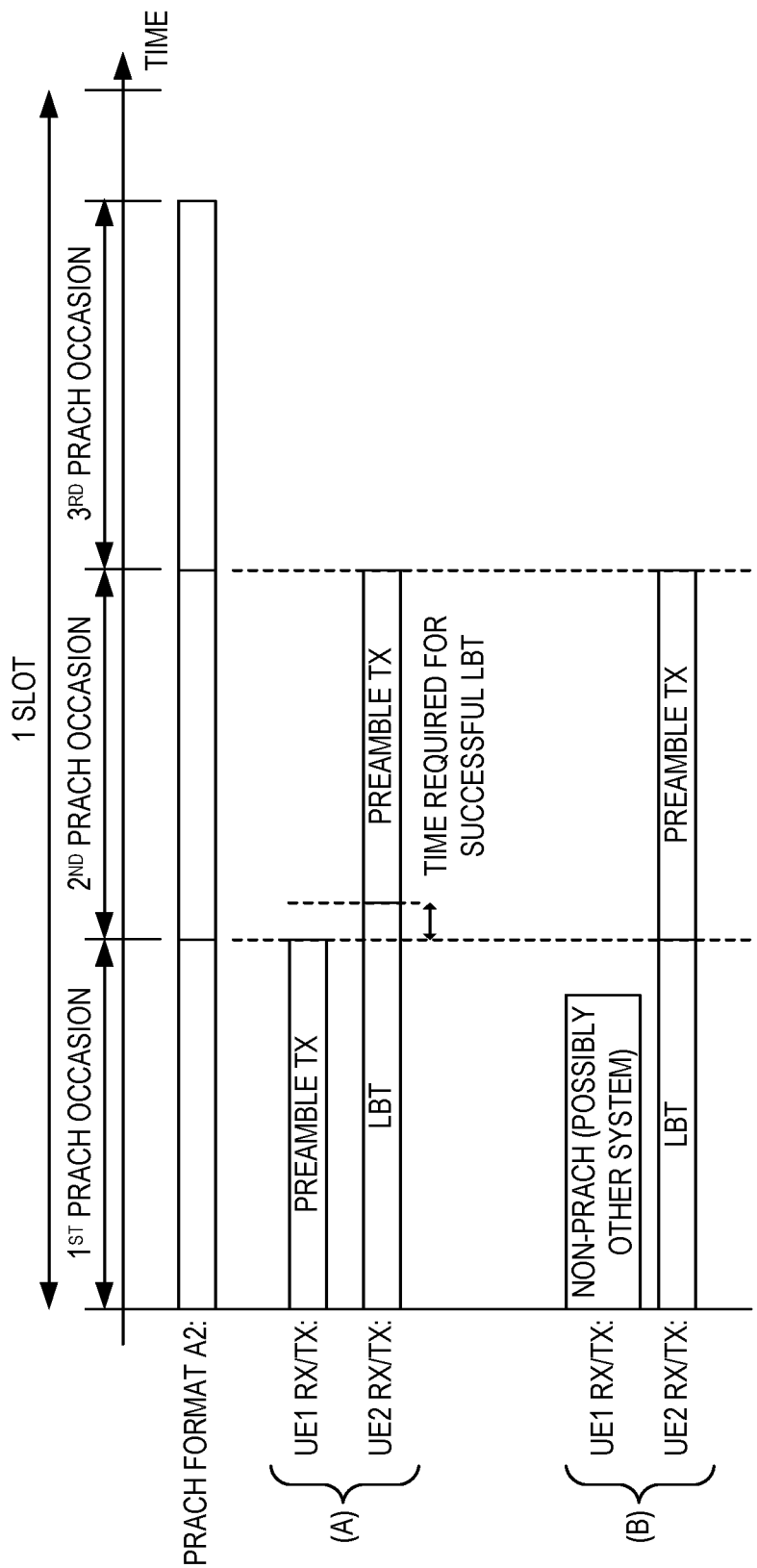
FIG. 11 illustrates examples of PRACH preamble puncturing performed in later LBT success and early LBT success scenarios.

An example is shown in FIG. 11. In case (a) of FIG. 11 (later LBT success, i.e., after the start of the $2^{nd}$ PRACH occasion), UE1 transmits a preamble in PRACH occasion 1, forcing UE2 to puncture the beginning of PRACH occasion 2 in order to perform LBT. In contrast, in case (b) of FIG. 11 (early LBT success prior to the start of the $2^{nd}$ PRACH occasion), while PRACH occasion 1 is still blocked for preamble transmission by UE2, there is a gap for LBT at the end of PRACH occasion 1 allowing for successful LBT of UE2, and hence UE2 can start preamble transmission at the beginning of PRACH occasion 2, without puncturing. The adaptive gap size can be useful to configure or define a maximum allowed gap. The maximum gap duration can be universally fixed (e.g., in the standard) or specified differently depending on other network configurations such as, e.g., PRACH format, frequency band, and/or PRACH subcarrier spacing. The maximum gap duration can also be signaled, e.g., in SIB1 where RACH configuration is indicated for standalone or dual-connectivity deployments. Alternatively, the gap can be signaled by dedicated (e.g., RRC) signaling on a licensed carrier, for example, non-standalone (licensed assisted), deployments. This can be useful for CBRA on SCells or PSCells in unlicensed spectrum. Puncturing duration can in principle also be signaled more dynamically (e.g., via PDCCH and/or handover command), since it is not crucial for all UEs in the cell to have the same puncturing duration all the time. Moreover, different puncturing for different UEs can be used as a means for adjusting PRACH priority between UEs, which is not possible with the RACH configuration table, adapting to PRACH/network load etc. Puncturing duration can be different for CFRA and CBRA, and/or be different for CONNECTED and IDLE mode.

In case of adaptive gap size, it can also be useful to specify or configure a minimum allowed gap. This can be used to reduce uncertainty in terms of gap size and avoid creating interference during a period when the base station detector, for example, detector at the base station (e.g., gNB) for detecting a PRACH preamble), may have not been listening for the preamble. The minimum gap duration can be determined by similar methods as described above for determining the maximum gap duration, for example, predefined by specification or signaled.

The UE can be allowed to adapt the gap to any duration between the minimum and maximum allowed gap duration, e.g., by specifications and/or network signaling. Alternatively, the UE can only be allowed to use gap durations of certain predetermined sizes, e.g., with a granularity of whole OFDM symbols or specified fractions thereof.

In the case of adaptive gap size, the PRACH detector in the base station may base the detection on only a signal received during the part of the PRACH occasion that cannot be punctured and/or the signal received during the part that can potentially be punctured. Furthermore, the base station may choose between the two approaches (or any approach in between) based on the measurements and/or estimates and/or other knowledge about the spectrum usage and/or PRACH load and/or network configuration. For example, if the base station knows that the spectrum load is high and there is a higher risk for a large puncturing duration in order to have successful LBT, the network may choose to include only a signal from the part that cannot be punctured to avoid collecting unnecessary noise. In this regard, if the base station knows that the spectrum load is low, the base station can also include a signal from the part that can potentially be punctured in order to maximize collected signal energy and increase coverage. If the detector does include parts that may be punctured, the base station may choose to give them lower weight in the detection process.

In one embodiment, the gNB can select the detection starting point based on a history of PRACH detections from the same or other UEs.

In one embodiment, the UE can use a larger transmit power to compensate for the shortened duration of the preamble in case of a gap. For example, the UE can set the transmit power such that the total energy of the preamble is the same as if no gap had been used. Note that this embodiment is in principle applicable both in the case where the gap duration is signaled by the network and in the case where the gap duration is adaptively selected by the UE. The larger transmit power can be applied on the very first preamble transmission or starting on a later preamble transmission if the UE does not receive a random access response (Msg 2) from the gNB.

Whether or not the UE applies larger transmit power to compensate for the shorter duration can also be controlled by the gNB through signaling, for example, by a field in SIB1 or dedicated (e.g., RRC) signaling. In another embodiment, the UE can use a wider bandwidth for preamble transmission to help compensate for the shortened duration. Note that due to Power Spectral Density (PSD) restrictions in unlicensed spectrum, a wider bandwidth may be needed to increase transmission power.

The configuration of the gap duration (or minimum and/or maximum duration in case of adaptive duration) can be based on estimated, predicted, or measured network load. For example, the gap can be set larger if there is high load and hence high risk for LBT failure, and smaller if there is low load in order to make the preamble energy larger (leading to better coverage).

The configuration of the gap duration (or minimum and/or maximum duration in case of adaptive duration) can be partly based on measured, predicted, or estimated propagation delays in the network cell or area. In some embodiments, the gap (or maximum gap in case of adaptive gap) between preambles is different between different preamble occasions, e.g. longer towards the end of the slot to facilitate LBT for UEs that may have failed one or more LBTs earlier in the slot. The UE can also be allowed to increase the gap based on how many earlier failed LBTs the UE has experienced.

Figure 3:
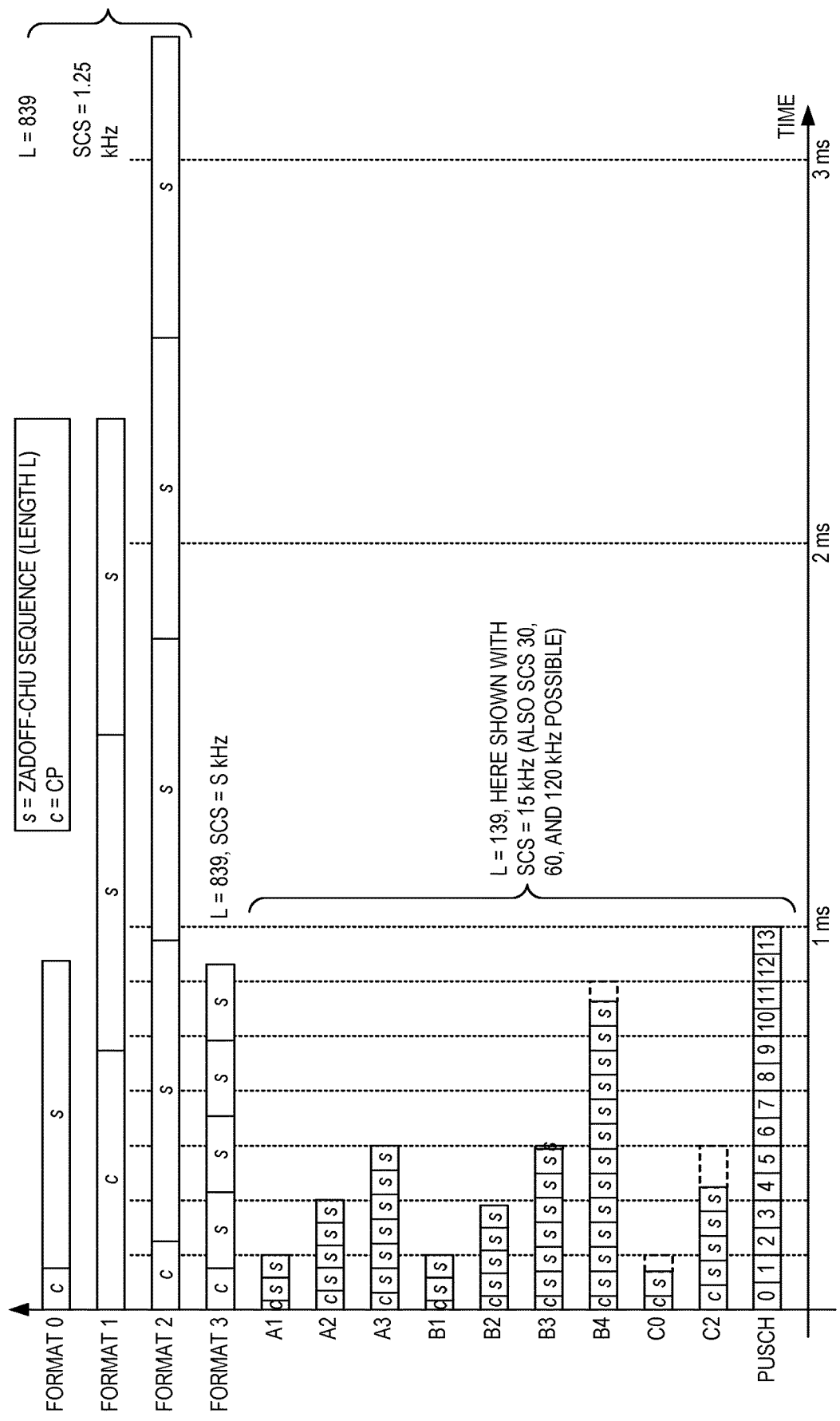
FIG. 3 illustrates exemplary Physical Random Access Channel (PRACH) formats supported in NR Release 15.
Figure 4:
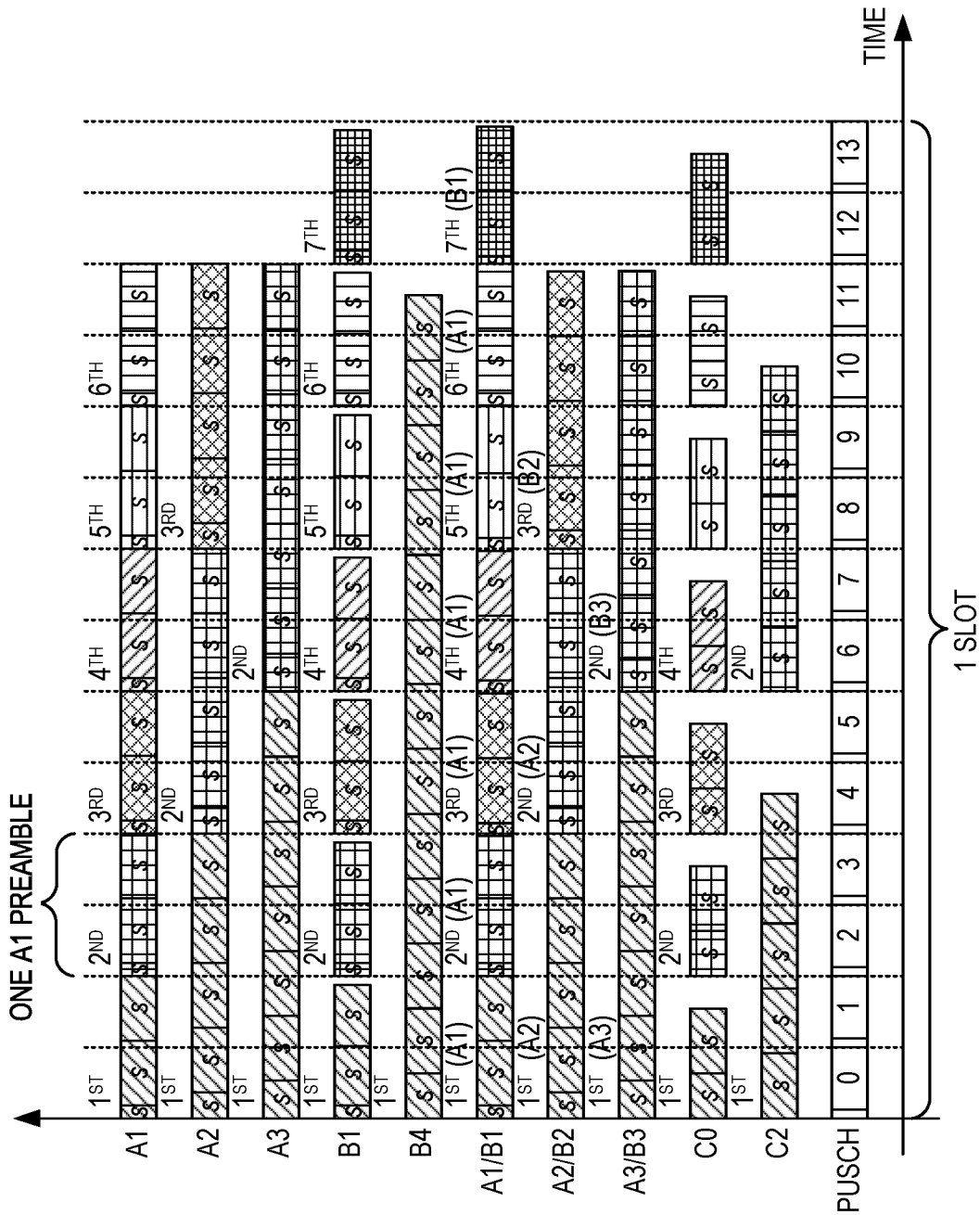
FIG. 4 illustrates multiple preambles time-multiplexed in a single slot in a short-sequence format (L=139) of the PRACH formats in FIG. 3.

In one embodiment, applicable primarily in case of puncturing at the end of the preamble, it is possible to redefine the preamble generation such that there will, in spite of the puncturing, still be a full Zadoff-Chu sequence "s" at the end of the preamble, similar to NR Release 15 as shown in FIG. 3.

In addition to puncturing preambles, it is also possible to modify RACH configuration tables, e.g. by increasing the value in the last column (duration).

As understood from the above discussion on preamble puncturing, puncturing at the end is most beneficial when the propagation delay is long and puncturing at the beginning is most beneficial when the propagation delay is short. In some embodiments, this aspect is leveraged to introduce another dimension of adaptability, where the choice of puncturing at the end or the beginning is adapted to the assumed propagation delay. In some embodiments, the system information includes rules governing this puncturing choice, or optionally, such rules or configuration can be provided to a UE through dedicated signaling, for example RRC signaling (e.g., any time while the UE is in RRC_CONNECTED state with an RRCReconfiguration message as an example, or when the UE is switched to RRC_INACTIVE or RRC_IDLE state with an RRCRelease message).

It may be difficult to accurately know the propagation delay beforehand. Nevertheless, it is possible to estimate a tendency and make intelligent reasonable predictions. The following are a few strategies:

When a UE is handed over into a cell, it is typically close to the cell edge and hence relatively long propagation delays can be assumed. Hence, in some embodiments, UEs are configured to perform puncturing at the end of the preamble when performing random access in conjunction with handover, but to puncture in the beginning of the preamble when performing random access in other situations.

In some embodiments, the rule can be specified in relation to the received power of a pilot signal. For instance, SSB Reference Signal Received Power (RSRP) above a threshold (implying higher probability of relatively short propagation delay) will trigger puncturing in the beginning of the preamble, while SSB RSRP below the threshold (implying higher probability of relatively long propagation delay) will trigger puncturing at the end of the preamble.

In some embodiments, alternative to the plain SSB RSRP threshold, the threshold can be set in relation to path loss estimation that is based on comparing the received signal power with information (e.g., in the system information) of the transmission power used for the signal. Large pathloss implies higher probability of relatively long propagation delay, which in turn implies that puncturing at the end of the preamble would be beneficial. Small pathloss implies higher probability of relatively short propagation delay, which in turn implies that puncturing in the beginning of the preamble would be beneficial. Hence, a pathloss based rule with a single threshold could be used to trigger puncturing in the beginning or at the end of the preamble.

In some embodiments, the rule is based on last used timing advance (TA) in the cell, e.g., TA<threshold leads to puncturing in the beginning of the preamble, TA≥threshold⇒leads to puncturing at the end of the preamble. This can be used, for example, in situations where the UE is in RRC_CONNECTED state, but the UE's TA has timed out and the UE performs random access to re-acquire a valid TA (on UE's own initiative, e.g., as a scheduling request, or triggered by a PDCCH order from the gNB). It is also possible to use this approach when performing random access to transit from RRC_IDLE or RRC_INACTIVE to RRC_CONNECTED state in cases where the UE has remained in the same cell since the UE was switched from RRC_CONNECTED to RRC_IDLE or RRC_INACTIVE state.

In some embodiments, a fixed, cell-specific configuration is used. For example, if a particular cell is a large cell, puncturing is introduced at the end of the preamble. In contrast, if the cell is a small cell, puncturing is introduced in the beginning of the preamble.

In some embodiments, the gNB broadcasts position (e.g., geographical coordinates) of the cell's antenna, and the UE compares the broadcasted position with the UE's own position as indicated by, for example, Global Navigation Satellite System (GNSS) (e.g., Global Positioning System (GPS)) receiver of the UE and calculates the propagation delay assuming line of sight between the UE's antenna(s) and the gNB antenna site. The UE then chooses puncturing in the beginning of the preamble if the estimated propagation delay is below a configured threshold or puncturing at the end of the preamble if the estimated propagation delay is above the configured threshold.

Combinations of the above approaches are also possible. One combination principle can be that two thresholds are used, where the thresholds are directly or indirectly relate to the estimated propagation delay. Accordingly, different puncturing or different puncturing rules can be employed depending whether the measurement entity related to the thresholds is below the low threshold, above the high threshold, or in between the thresholds. For example, two SSB RSRP thresholds: $T_{low}$, $T_{high}$ are employed. When SSB RSRP<$T_{low}$, the puncturing is made at the end of the preamble. When SSB RSRP>$T_{high}$, the puncturing is made at the beginning of the preamble. When $T_{low}$≤SSB RSRP≤$T_{high}$, the puncturing is determined based on a last used TA, if any. Otherwise, any approach may be chosen, including no puncturing at all.

In conjunction with handover, the choice of puncturing at the end or the beginning of the preamble, as well as the duration of the gap, may also be configured in the HandoverCommand (e.g., based on the UE's measurement report), which SSB the UE has selected (e.g., indicated as the SSB with the greatest RSRP or RSRQ), which the source cell is, and so on. The gNB may use machine learning (or experience in general) to adapt its policy for the puncturing/gap configuration to include in the HandoverCommand. The above type of rules can also be used to configure gap duration or minimum and/or maximum duration of adaptive gaps.

In one embodiment, there is a rule that PRACH occasions should be prolonged, for example extended in time (e.g., distance between PRACH occasion starting points in time is increased), if puncturing is used, or enabled, or if the amount of puncturing, or maximum puncturing duration, and/or minimum puncturing duration, exceeds a certain threshold or certain thresholds. Preferably, the puncturing duration is then automatically shortened (e.g., to zero duration) since the prolonged PRACH occasions anyway create gaps. (Possibly, the actual preamble transmission duration can then even be increased beyond the duration of the nominal non-prolonged preamble duration.) The prolongation can be particularly useful for short formats such as format A1, where puncturing can otherwise make the preamble too short for reliable detection, meaning that it is better to effectively insert (e.g., one empty OFDM symbol) as a gap between non-punctured preambles (PRACH occasions) rather than performing puncturing. The number of preambles per slot may then also have to be automatically reduced to ensure that there is still a sufficient gap at the end of the slot (or at least to ensure that the PRACH occasions do not spill over into the next slot).

The threshold(s) can be defined in terms of absolute time duration of puncturing, either in seconds, or as a number of samples, or a fraction of one OFDM symbol. Alternatively, the threshold(s) can be related to the nominal (non-prolonged) PRACH occasion duration or nominal preamble duration. For example, prolongation could happen if the puncturing exceeds X % of the PRACH occasion or preamble duration, or if puncturing would make only Y % or less remain of the PRACH occasion or preamble duration. There can also be multiple thresholds for each quantity (e.g., for maximum puncturing duration) so that additional prolongation happens if additional thresholds are exceeded. The prolongation can be an integer number of OFDM symbols or certain predetermined fractions thereof. The prolongation rule and threshold rules can be different for different PRACH formats and/or signaled by the network (explicitly or implicitly from other configuration settings).

Figure 12:
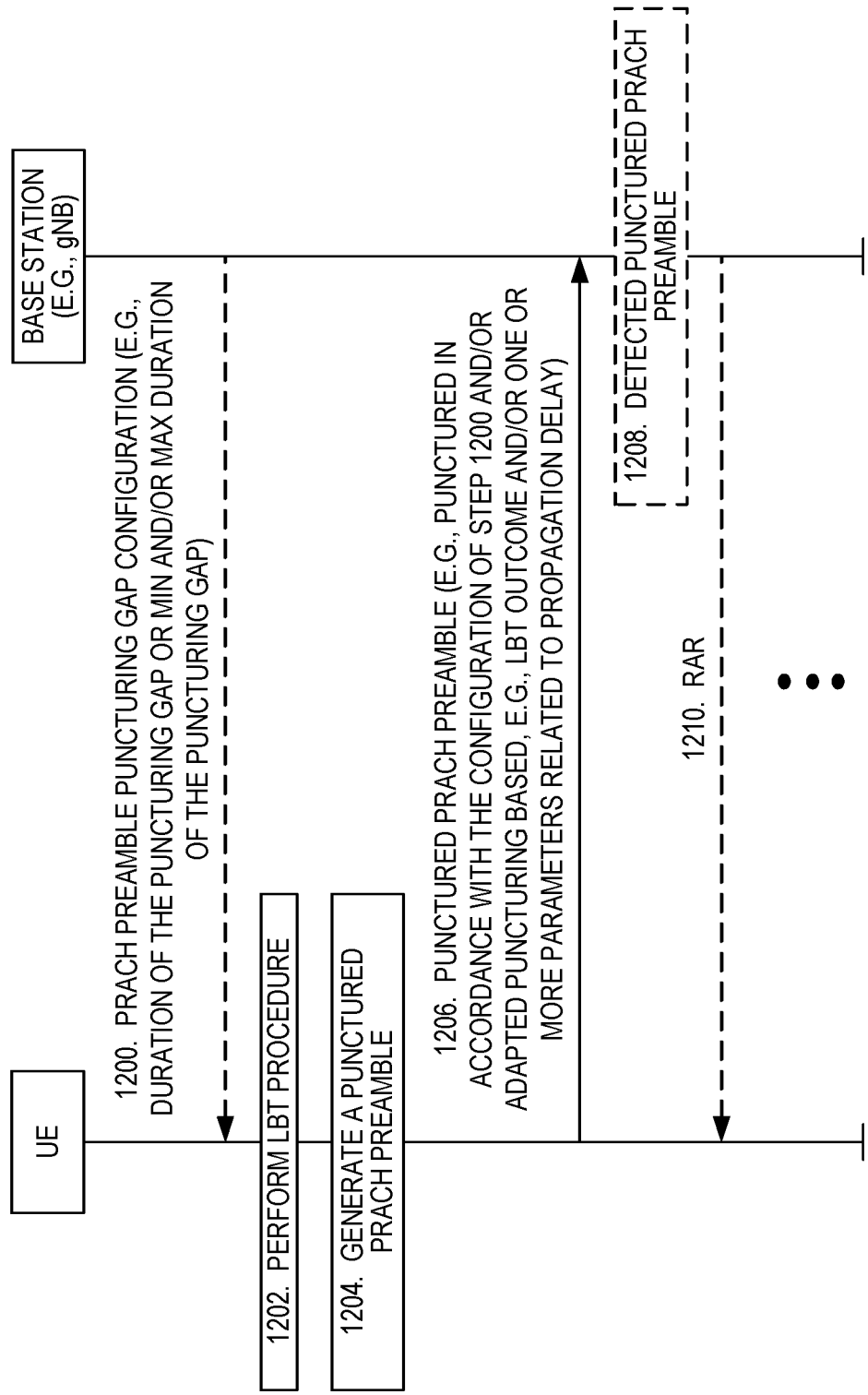
FIG. 12 illustrates a method performed by a wireless device (e.g., a User Equipment (UE)) and a base station for accessing a cellular communications network in unlicensed spectrum in accordance with at least some aspects of the embodiments described above.

FIG. 12 illustrates the operation of a UE (e.g., a wireless device 812) and a base station (e.g., a base station 802 such as, e.g., a gNB) in accordance with at least some aspects of the embodiments described above. Note that while only some aspects are described with respect to FIG. 12, it is to be appreciated that this process may incorporate any of the aspects of any of the embodiments described above. Note that optional steps are represented by dashed lines.

As illustrated, the base station optionally sends a PRACH preamble puncturing gap configuration to the UE (step 1200). As discussed above, this configuration may include information that defines a fixed size of the gap or, in some other embodiments, a minimum and/or maximum size of the gap. The configuration may also include information that indicates the location of the gap (e.g., at the beginning of the PRACH preamble, at the end of the PRACH preamble, or at both the beginning and the end of the PRACH preamble).

Figure 13:
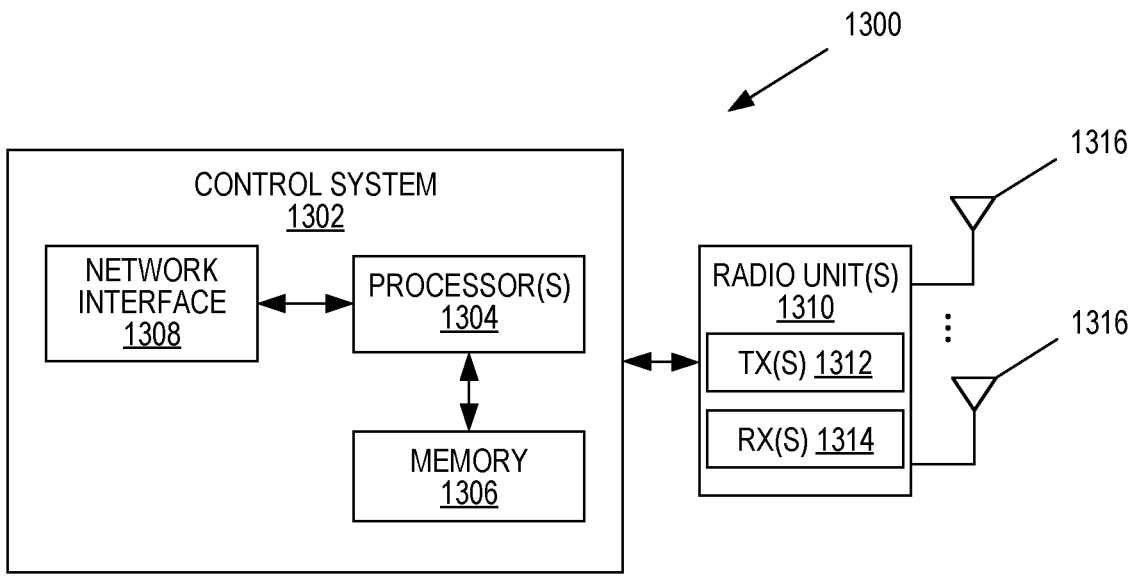
FIG. 13 is a schematic block diagram of a radio access node according to some embodiments of the present disclosure.

The UE performs an LBT procedure, as described above (step 1202). The UE generates a punctured PRACH preamble, e.g., by puncturing a corresponding PRACH preamble (sometimes referred to herein as a "non-punctured" PRACH preamble) in accordance with any of the embodiments described herein (step 1204). Upon LBT success, the UE transmits the punctured PRACH preamble (step 1206). As discussed above, the punctured PRACH preamble is transmitted in an Nth PRACH occasion in a set of two or more back-to-back PRACH occasions such that the punctured PRACH creates a gap between the Nth PRACH occasion and either or both of the (N−1)th PRACH occasion and the (N+1)th PRACH occasion. At the base station, the base station detects the punctured PRACH preamble transmitted by the UE (step 1208), as described above. In response, the base station transmits a RAR to the UE (step 1210). FIG. 13 is a schematic block diagram of a radio access node 1300 according to some embodiments of the present disclosure. The radio access node 1300 may be, for example, a base station 802 or 806. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 includes one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein (e.g., one or more functions of the gNB or one or more functions of the base station of, e.g., FIG. 12). In some embodiments, the function(s) are implemented in software that is stored, e.g., in the memory 1306 and executed by the one or more processors 1304.

Figure 14:
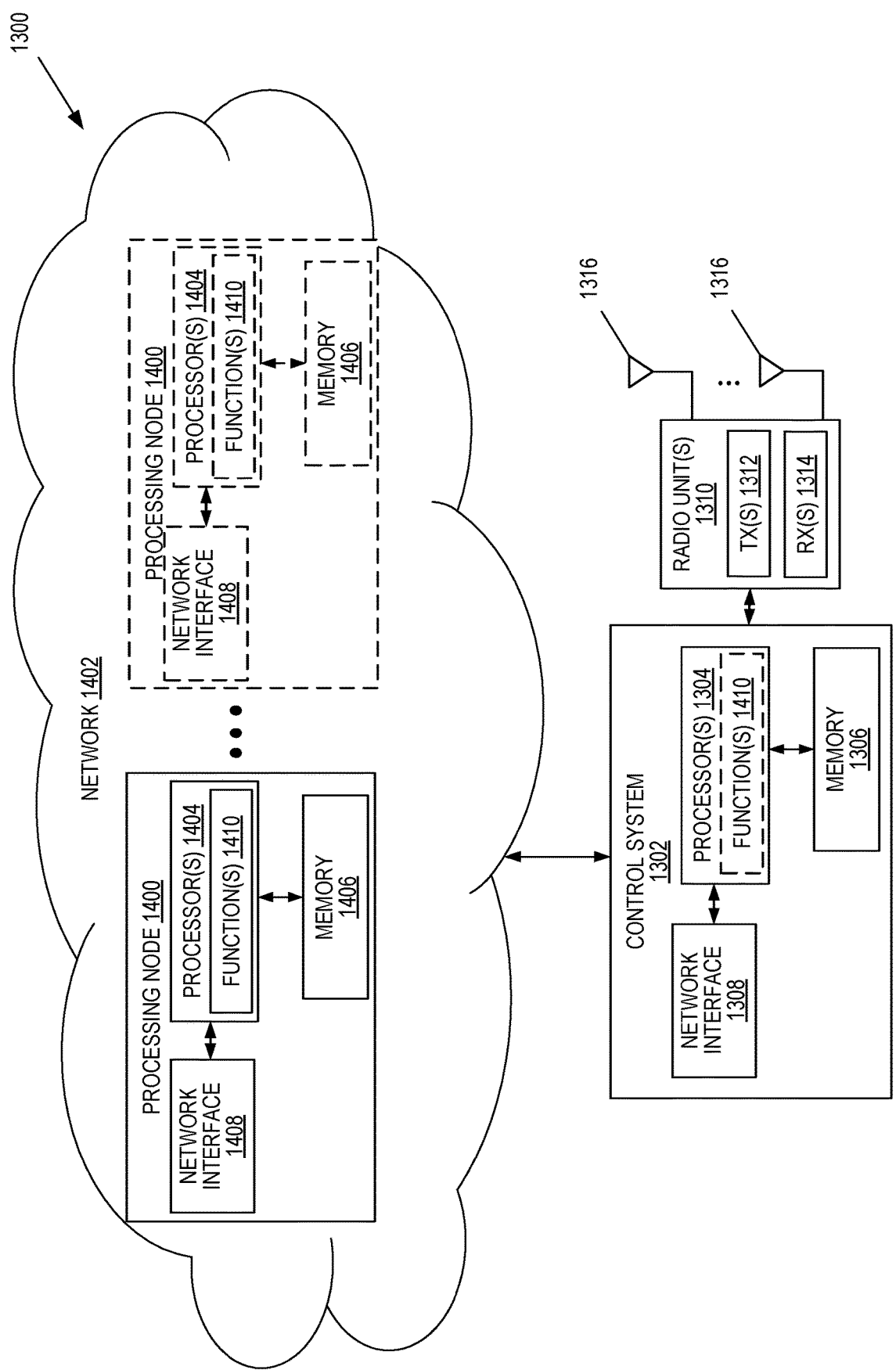
FIG. 14 is a schematic block diagram that illustrates a virtualized embodiment of the radio access node according to some embodiments of the present disclosure.

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 (e.g., one or more functions of the gNB or one or more functions of the base station of, e.g., FIG. 12) is implemented as a virtual component(s) (e.g., via a virtual machine(s) executing on a physical processing node(s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1404 (e.g., CPUs, ASICs, FPGAs, and/or the like), memory 1406, and a network interface 1408.

In this example, functions 1410 of the radio access node 1300 described herein (e.g., one or more functions of the gNB or one or more functions of the base station of, e.g., FIG. 12) are implemented at the one or more processing nodes 1400 or distributed across the control system 1302 and the one or more processing nodes 1400 in any desired manner. In some particular embodiments, some or all of the functions 1410 of the radio access node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicates directly with the processing node(s) 1400 via an appropriate network interface(s).

In some embodiments, a computer program including instructions which, when executed by at least one processor, causes the at least one processor to carry out the functionality of radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
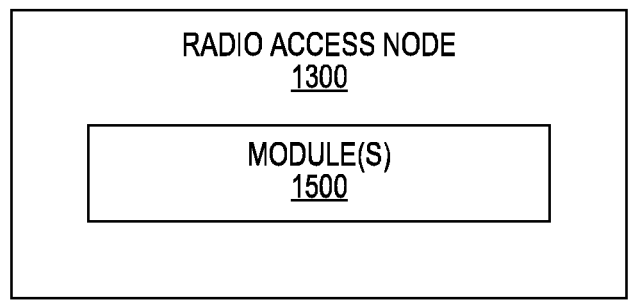
FIG. 15 is a schematic block diagram of the radio access node according to some other embodiments of the present disclosure.

FIG. 15 is a schematic block diagram of the radio access node 1300 according to some other embodiments of the present disclosure. The radio access node 1300 includes one or more modules 1500, each of which is implemented in software. The module(s) 1500 provides the functionality of the radio access node 1300 described herein (e.g., one or more functions of the gNB or one or more functions of the base station of, e.g., FIG. 12). This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
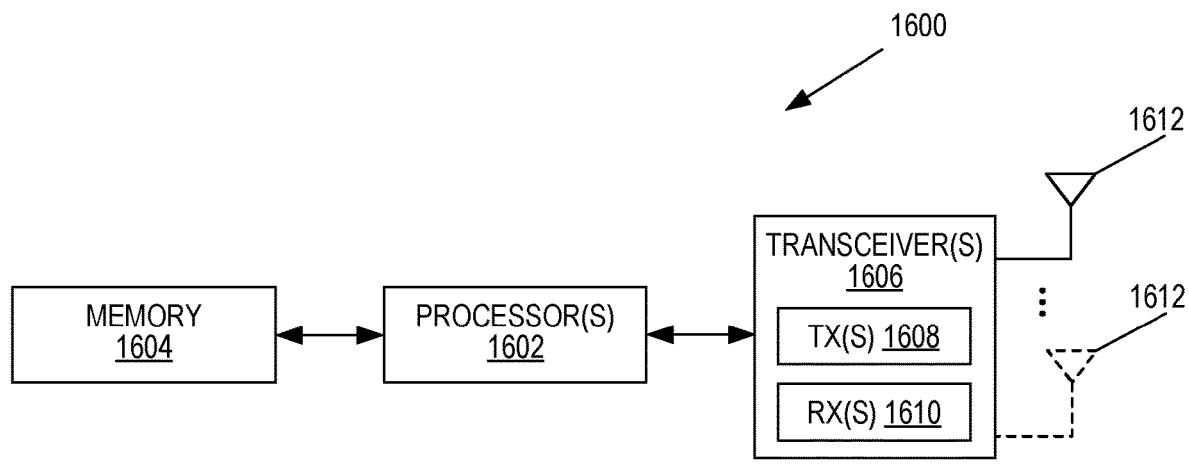
FIG. 16 is a schematic block diagram of a UE according to some embodiments of the present disclosure.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by one of ordinary skill in the art. The processors 1602 are also referred to herein as processing circuitry. The transceivers 1606 are also referred to herein as radio circuitry. In some embodiments, the functionality of the UE 1600 described above (e.g., one or more functions of the wireless device or UE or one or more functions of the UE of, e.g., FIG. 12) may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions which, when executed by at least one processor, causes the at least one processor to carry out the functionality of the UE 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
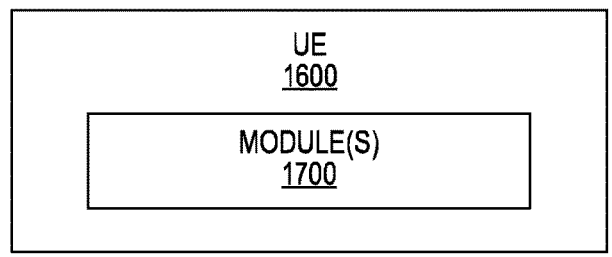
FIG. 17 is a schematic block diagram of the UE of FIG. 16 according to some other embodiments of the present disclosure.
Figure 18:
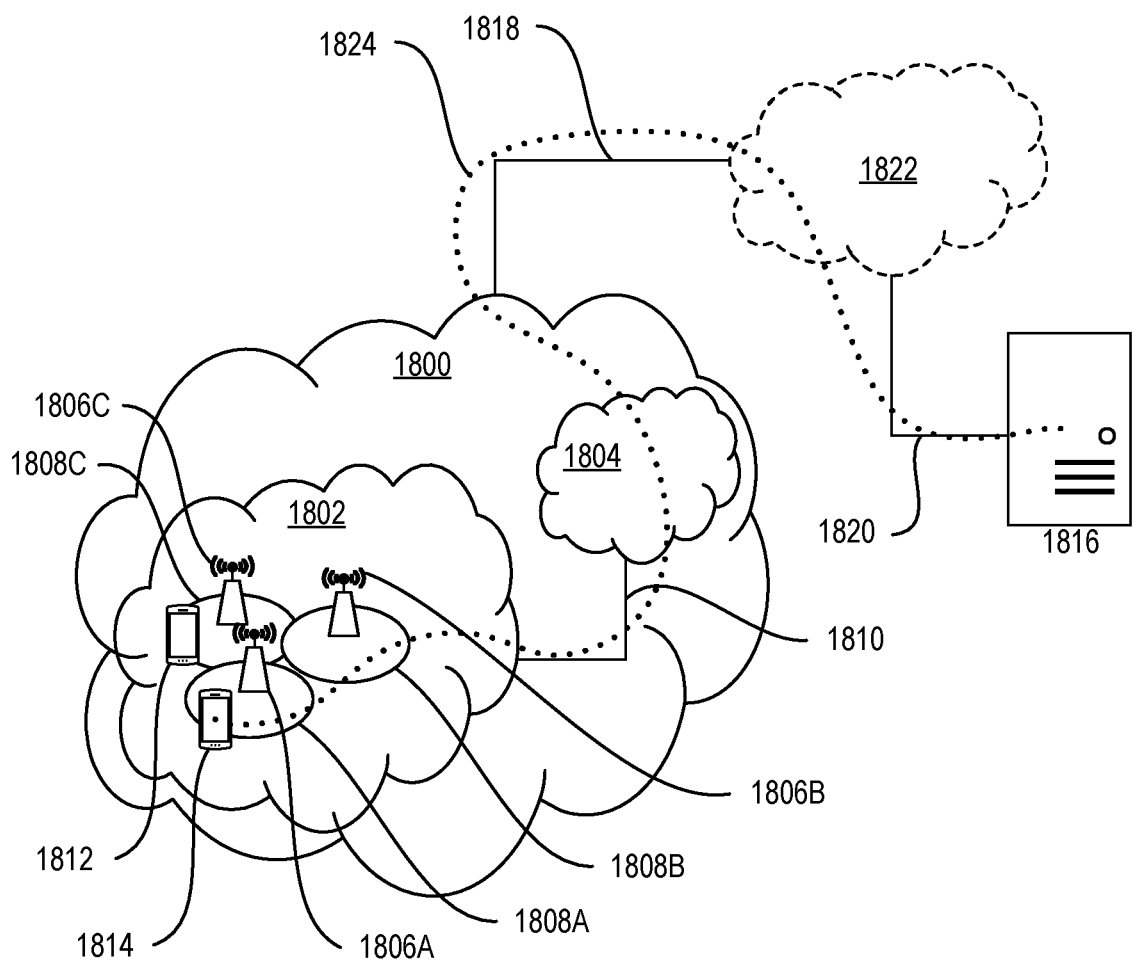
FIG. 18 is a schematic block diagram of a communication system that includes a telecommunication network.

FIG. 17 is a schematic block diagram of the UE 1600 according to some other embodiments of the present disclosure. The UE 1600 includes one or more modules 1700, each of which is implemented in software. The module(s) 1700 provides the functionality of the UE 1600 described herein (e.g., one or more functions of the wireless device or UE or one or more functions of the UE of, e.g., FIG. 12). With reference to FIG. 18, in accordance with an embodiment, a communication system includes a telecommunication network 1800, such as a 3GPP-type cellular network, which comprises an access network 1802, such as a RAN, and a core network 1804. The access network 1802 comprises a plurality of base stations 1806A, 1806B, 1806C, such as NBs, eNBs, gNBs, or other types of wireless Access Points (APs), each defining a corresponding coverage area 1808A, 1808B, 1808C. Each base station 1806A, 1806B, 1806C is connectable to the core network 1804 over a wired or wireless connection 1810. A first UE 1812 located in coverage area 1808C is configured to wirelessly connect to, or be paged by, the corresponding base station 1806C. A second UE 1814 in coverage area 1808A is wirelessly connectable to the corresponding base station 1806A. While a plurality of UEs 1812, 1814 are illustrated in this example, the disclosed embodiments are equally applicable to a situation where a sole UE is in the coverage area or where a sole UE is connecting to the corresponding base station 1806.

The telecommunication network 1800 is itself connected to a host computer 1816, which may be embodied in the hardware and/or software of a standalone server, a cloud-implemented server, a distributed server, or as processing resources in a server farm. The host computer 1816 may be under the ownership or control of a service provider, or may be operated by the service provider or on behalf of the service provider. Connections 1818 and 1820 between the telecommunication network 1800 and the host computer 1816 may extend directly from the core network 1804 to the host computer 1816 or may go via an optional intermediate network 1822. The intermediate network 1822 may be one of, or a combination of more than one of, a public, private, or hosted network; the intermediate network 1822, if any, may be a backbone network or the Internet; in particular, the intermediate network 1822 may comprise two or more sub-networks (not shown).

The communication system of FIG. 18 as a whole enables connectivity between the connected UEs 1812, 1814 and the host computer 1816. The connectivity may be described as an Over-the-Top (OTT) connection 1824. The host computer 1816 and the connected UEs 1812, 1814 are configured to communicate data and/or signaling via the OTT connection 1824, using the access network 1802, the core network 1804, any intermediate network 1822, and possible further infrastructure (not shown) as intermediaries. The OTT connection 1824 may be transparent in the sense that the participating communication devices through which the OTT connection 1824 passes are unaware of routing of uplink and downlink communications. For example, the base station 1806 may not or need not be informed about the past routing of an incoming downlink communication with data originating from the host computer 1816 to be forwarded (e.g., handed over) to a connected UE 1812. Similarly, the base station 1806 need not be aware of the future routing of an outgoing uplink communication originating from the UE 1812 towards the host computer 1816.

Figure 19:
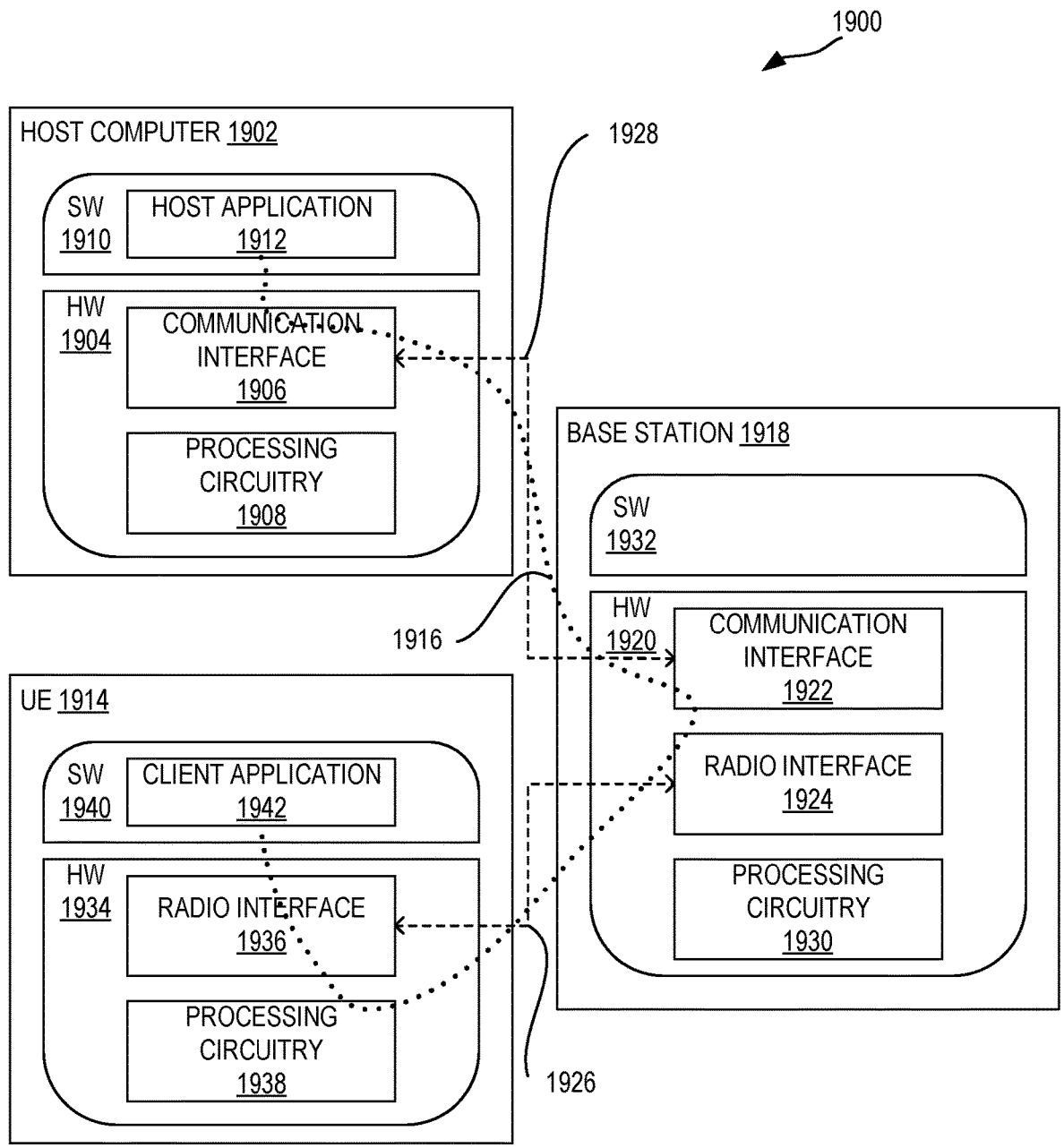
FIG. 19 is a schematic block diagram of the communication system of FIG. 18 according some embodiments of the present disclosure.

Example implementations, in accordance with an embodiment, of the UE, base station, and host computer discussed in the preceding paragraphs will now be described with reference to FIG. 19. In a communication system 1900, a host computer 1902 comprises hardware 1904 including a communication interface 1906 configured to set up and maintain a wired or wireless connection with an interface of a different communication device of the communication system 1900. The host computer 1902 further comprises processing circuitry 1908, which may have storage and/or processing capabilities. In particular, the processing circuitry 1908 may comprise one or more programmable processors, ASICs, FPGAs, or combinations of these (not shown) adapted to execute instructions. The host computer 1902 further comprises software 1910, which is stored in or accessible by the host computer 1902 and executable by the processing circuitry 1908. The software 1910 includes a host application 1912. The host application 1912 may be operable to provide a service to a remote user, such as a UE 1914 connecting via an OTT connection 1916 terminating at the UE 1914 and the host computer 1902. In providing the service to the remote user, the host application 1912 may provide user data which is transmitted using the OTT connection 1916.

The communication system 1900 further includes a base station 1918 provided in a telecommunication system and comprising hardware 1920 enabling it to communicate with the host computer 1902 and with the UE 1914. The hardware 1920 may include a communication interface 1922 for setting up and maintaining a wired or wireless connection with an interface of a different communication device of the communication system 1900, as well as a radio interface 1924 for setting up and maintaining at least a wireless connection 1926 with the UE 1914 located in a coverage area (not shown in FIG. 19) served by the base station 1918. The communication interface 1922 may be configured to facilitate a connection 1928 to the host computer 1902. The connection 1928 may be direct or it may pass through a core network (not shown in FIG. 19) of the telecommunication system and/or through one or more intermediate networks outside the telecommunication system. In the embodiment shown, the hardware 1920 of the base station 1918 further includes processing circuitry 1930, which may comprise one or more programmable processors, ASICs, FPGAs, or combinations of these (not shown) adapted to execute instructions. The base station 1918 further has software 1932 stored internally or accessible via an external connection. The communication system 1900 further includes the UE 1914 already referred to. The UE's 1914 hardware 1934 may include a radio interface 1936 configured to set up and maintain a wireless connection 1926 with a base station serving a coverage area in which the UE 1914 is currently located. The hardware 1934 of the UE 1914 further includes processing circuitry 1938, which may comprise one or more programmable processors, ASICs, FPGAs, or combinations of these (not shown) adapted to execute instructions. The UE 1914 further comprises software 1940, which is stored in or accessible by the UE 1914 and executable by the processing circuitry 1938. The software 1940 includes a client application 1942. The client application 1942 may be operable to provide a service to a human or non-human user via the UE 1914, with the support of the host computer 1902. In the host computer 1902, the executing host application 1912 may communicate with the executing client application 1942 via the OTT connection 1916 terminating at the UE 1914 and the host computer 1902. In providing the service to the user, the client application 1942 may receive request data from the host application 1912 and provide user data in response to the request data. The OTT connection 1916 may transfer both the request data and the user data. The client application 1942 may interact with the user to generate the user data that it provides. It is noted that the host computer 1902, the base station 1918, and the UE 1914 illustrated in FIG. 19 may be similar or identical to the host computer 1816, one of the base stations 1806A, 1806B, 1806C, and one of the UEs 1812, 1814 of FIG. 18, respectively. This is to say, the inner workings of these entities may be as shown in FIG. 19 and independently, the surrounding network topology may be that of FIG. 18. In FIG. 19, the OTT connection 1916 has been drawn abstractly to illustrate the communication between the host computer 1902 and the UE 1914 via the base station 1918 without explicit reference to any intermediary devices and the precise routing of messages via these devices. The network infrastructure may determine the routing, which may be configured to hide from the UE 1914 or from the service provider operating the host computer 1902, or both. While the OTT connection 1916 is active, the network infrastructure may further take decisions by which it dynamically changes the routing (e.g., on the basis of load balancing consideration or reconfiguration of the network).

The wireless connection 1926 between the UE 1914 and the base station 1918 is in accordance with the teachings of the embodiments described throughout this disclosure. One or more of the various embodiments improve the performance of OTT services provided to the UE 1914 using the OTT connection 1916, in which the wireless connection 1926 forms the last segment. More precisely, the teachings of these embodiments may improve, e.g., latency and/or power consumption and thereby provide benefits such as, e.g., reduced user waiting time, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1916 between the host computer 1902 and the UE 1914, in response to variations in the measurement results. The measurement procedure and/or the network functionality for reconfiguring the OTT connection 1916 may be implemented in the software 1910 and the hardware 1904 of the host computer 1902 or in the software 1940 and the hardware 1934 of the UE 1914, or both. In some embodiments, sensors (not shown) may be deployed in or in association with communication devices through which the OTT connection 1916 passes; the sensors may participate in the measurement procedure by supplying values of the monitored quantities exemplified above, or supplying values of other physical quantities from which the software 1910, 1940 may compute or estimate the monitored quantities. The reconfiguring of the OTT connection 1916 may include message format, retransmission settings, preferred routing, etc.; the reconfiguring need not affect the base station 1918, and it may be unknown or imperceptible to the base station 1918. Such procedures and functionalities may be known and practiced in the art. In certain embodiments, measurements may involve proprietary UE signaling facilitating the host computer 1902's measurements of throughput, propagation times, latency, and the like. The measurements may be implemented in that the software 1910 and 1940 causes messages to be transmitted, in particular empty or 'dummy' messages, using the OTT connection 1916 while it monitors propagation times, errors, etc.

FIG. 20 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 20 will be included in this section. In step 2000, the host computer provides user data. In sub-step 2002 (which may be optional) of step 2000, the host computer provides the user data by executing a host application. In step 2004, the host computer initiates a transmission carrying the user data to the UE. In step 2006 (which may be optional), the base station transmits to the UE the user data which was carried in the transmission that the host computer initiated, in accordance with the teachings of the embodiments described throughout this disclosure. In step 2008 (which may also be optional), the UE executes a client application associated with the host application executed by the host computer.

FIG. 21 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 21 will be included in this section. In step 2100 of the method, the host computer provides user data. In an optional sub-step (not shown) the host computer provides the user data by executing a host application. In step 2102, the host computer initiates a transmission carrying the user data to the UE. The transmission may pass via the base station, in accordance with the teachings of the embodiments described throughout this disclosure. In step 2104 (which may be optional), the UE receives the user data carried in the transmission.

Figures 22, 23:
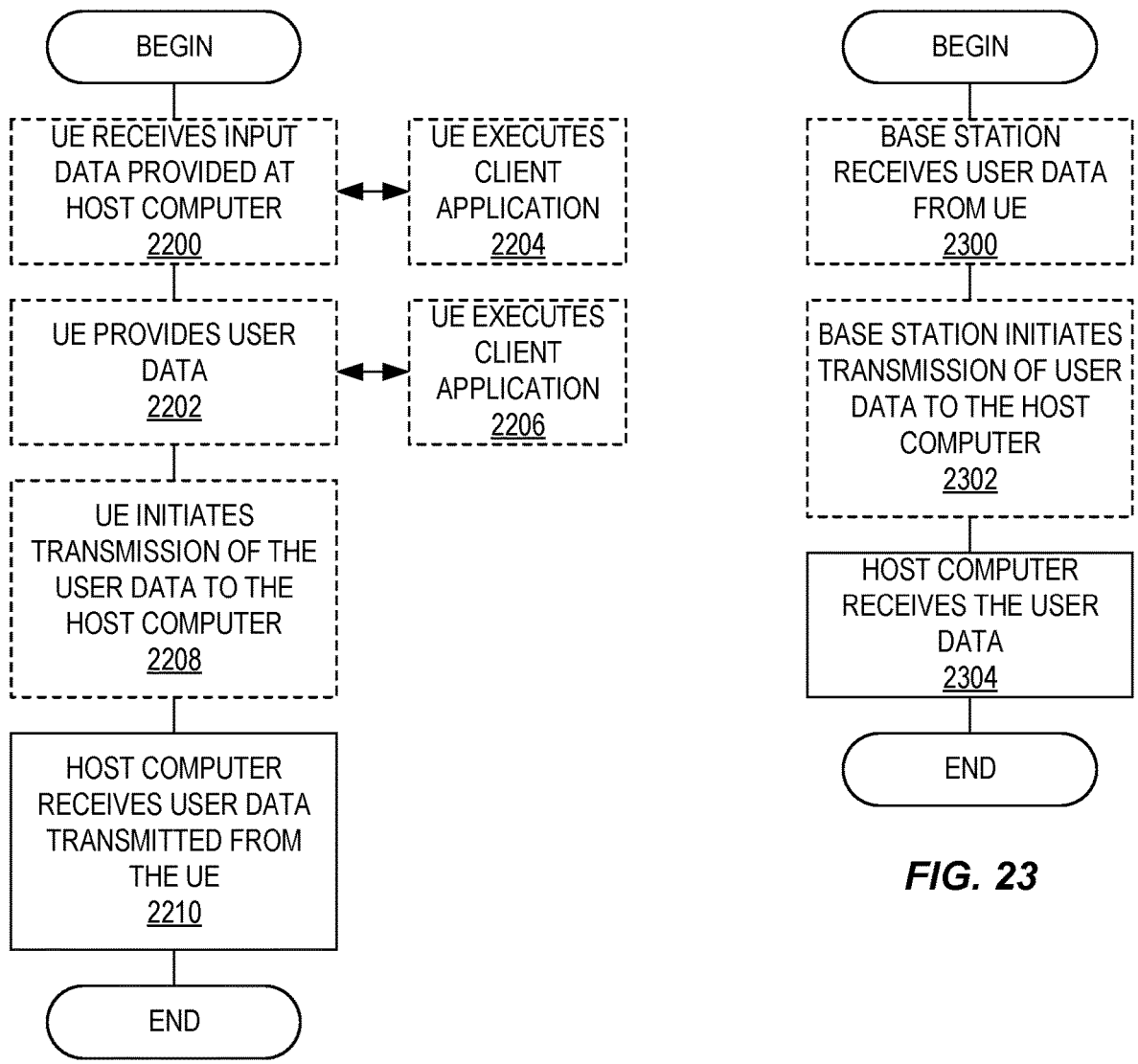
FIG. 22 is a flowchart illustrating a method implemented in a communication system in accordance with one embodiment of the present disclosure.
FIG. 23 is a flowchart illustrating a method implemented in a communication system in accordance with one embodiment of the present disclosure.

FIG. 22 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 22 will be included in this section. In step 2200 (which may be optional), the UE receives input data provided by the host computer. Additionally or alternatively, in step 2202, the UE provides user data. In sub-step 2204 (which may be optional) of step 2200, the UE provides the user data by executing a client application. In sub-step 2206 (which may be optional) of step 2202, the UE executes a client application which provides the user data in reaction to the received input data provided by the host computer. In providing the user data, the executed client application may further consider user input received from the user. Regardless of the specific manner in which the user data was provided, the UE initiates, in sub-step 2208 (which may be optional), transmission of the user data to the host computer. In step 2210 of the method, the host computer receives the user data transmitted from the UE, in accordance with the teachings of the embodiments described throughout this disclosure.

FIG. 23 is a flowchart illustrating a method implemented in a communication system, in accordance with one embodiment. The communication system includes a host computer, a base station, and a UE which may be those described with reference to FIGS. 18 and 19. For simplicity of the present disclosure, only drawing references to FIG. 23 will be included in this section. In step 2300 (which may be optional), in accordance with the teachings of the embodiments described throughout this disclosure, the base station receives user data from the UE. In step 2302 (which may be optional), the base station initiates transmission of the received user data to the host computer. In step 2304 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method performed by a wireless device random access in a cellular communications system in unlicensed spectrum, the method comprising: performing (1202) a Listen-Before-Talk, LBT, procedure; generating (1204) a punctured random access preamble; and transmitting (1206) the punctured random access preamble.

Embodiment 2: The method of embodiment 1 wherein transmitting (1206) the punctured random access preamble comprises transmitting (1206) the punctured random access preamble in one of two or more back-to-back random access occasions.

Embodiment 3: The method of embodiment 1 wherein transmitting (1206) the punctured random access preamble comprises transmitting (1206) the punctured random access preamble in one of two or more back-to-back random access occasions such that the punctured random access preamble creates a gap between the one of the two or more back-to-back random occasions and at least one other of the two or more random access preamble occasions.

Embodiment 4: The method of embodiment 1 wherein transmitting (1206) the punctured random access preamble comprises transmitting (1206) the punctured random access preamble in an Nth random access occasion from among two or more back-to-back random access occasions such that the punctured random access preamble creates a gap between the Nth random access occasion and either or both of: an (N−1)th random access occasion and an (N+1)th random access occasion, from among the two or more back-to-back random access occasions.

Embodiment 5: The method of any one of embodiments 1 to 4 wherein the punctured random access preamble is a version of a corresponding random access preamble that is punctured at the beginning of the corresponding random access preamble.

Embodiment 6: The method of any one of embodiments 1 to 4 wherein the punctured random access preamble is a version of a corresponding random access preamble that is punctured at the end of the corresponding random access preamble.

Embodiment 7: The method of embodiment 6 wherein generating (1204) the punctured random access preamble such that there is a full Zadoff-Chu sequence at the end of the punctured random access preamble.

Embodiment 8: The method of any one of embodiments 1 to 4 wherein the punctured random access preamble is a version of a corresponding random access preamble that is punctured at both the beginning and the end of the corresponding random access preamble.

Embodiment 9: The method of any one of embodiments 1 to 8 wherein the punctured random access preamble is a version of a corresponding random access preamble that is punctured during a puncturing gap.

Embodiment 10: The method of embodiment 9 wherein a duration of the puncturing gap is predefined.

Embodiment 11: The method of embodiment 9 wherein a duration of the puncturing gap is configured by a network node.

Embodiment 12: The method of embodiment 9 wherein a duration of the puncturing gap is a function of one or more parameters (e.g., random access channel format, frequency band, and/or random access channel subcarrier spacing).

Embodiment 13: The method of embodiment 9 wherein a duration of the puncturing gap is a function of estimated, predicted, or measured network load.

Embodiment 14: The method of embodiment 9 wherein a duration of the puncturing gap is a function of estimated, predicted, or measured propagation delay.

Embodiment 15: The method of embodiment 9 wherein a duration of the puncturing gap is adapted based on one or more parameters.

Embodiment 16: The method of embodiment 9 wherein a duration of the puncturing gap is adapted based on an outcome of the LBT procedure.

Embodiment 17: The method of embodiment 15 or 16 wherein the duration of the puncturing gap is greater than or equal to a predefined or configured minimum gap size.

Embodiment 18: The method of any one of embodiments 15 to 17 wherein the duration of the puncturing gap is less than or equal to a predefined or configured maximum gap size.

Embodiment 19: The method of any one of embodiments 15 to 18 wherein the duration of the puncturing gap is one of a number of predefined or configured possible gap sizes.

Embodiment 20: The method of any one of embodiments 1 to 19 wherein generating (1204) the punctured random access preamble comprises determining (1204) whether to puncture a corresponding random access preamble at the beginning of the corresponding random access preamble or at the end of the corresponding random access preamble, to provide the punctured random access preamble, based on one or more parameters related to propagation delay.

Embodiment 21: The method of any one of embodiments 1 to 20 wherein transmitting (1206) the punctured random access preamble comprises transmitting (1206) the punctured random access preamble at a transmit power that compensates for the shorter duration of the punctured random access preamble as compared to a corresponding non-punctured random access preamble.

Embodiment 22: The method of any one of embodiments 1 to 21 wherein transmitting (1206) the punctured random access preamble comprises transmitting (1206) the punctured random access preamble over a bandwidth that is wider than that used for a corresponding non-punctured random access preamble.

Embodiment 23: The method of any one of embodiments 1 to 22 wherein the punctured random access preamble is a punctured Physical Random Access Channel, PRACH, preamble.

Embodiment 24: The method of any one of embodiments 1 to 23 wherein transmitting (1206) the punctured random access preamble comprises transmitting (1206) the punctured random access preamble upon LBT success.

Embodiment 25: The method of any of the previous embodiments, further comprising: providing user data; and forwarding the user data to a host computer via the transmission to the base station.

Group B Embodiments

Embodiment 26: A method performed by a base station, the method comprising: detecting (1208) a punctured random access preamble transmitted by a wireless device in unlicensed spectrum; and in response, transmitting (1210) a random access response to the wireless device.

Embodiment 27: The method of embodiment 26 wherein detecting (1208) the punctured random access preamble comprises detecting (1208) the punctured random access preamble in one of two or more back-to-back random access occasions.

Embodiment 28: The method of embodiment 26 wherein detecting (1208) the punctured random access preamble comprises detecting (1208) the punctured random access preamble in one of two or more back-to-back random access occasions such that the punctured random access preamble creates a gap between the one of the two or more back-to-back random occasions and at least one other of the two or more random access preamble occasions.

Embodiment 29: The method of embodiment 26 wherein detecting (1208) the punctured random access preamble comprises detecting (1208) the punctured random access preamble in an Nth random access occasion from among two or more back-to-back random access occasions such that the punctured random access preamble creates a gap between the Nth random access occasion and either or both of: an (N−1)th random access occasion and an (N+1)th random access occasion, from among the two or more back-to-back random access occasions.

Embodiment 30: The method of any one of embodiments 26 to 29 wherein the punctured random access preamble is a version of a corresponding random access preamble that is punctured at the beginning of the corresponding random access preamble.

Embodiment 31: The method of any one of embodiments 26 to 29 wherein the punctured random access preamble is a version of a corresponding random access preamble that is punctured at the end of the corresponding random access preamble.

Embodiment 32: The method of embodiment 31 wherein the punctured random access preamble is such that there is a full Zadoff-Chu sequence at the end of the punctured random access preamble.

Embodiment 33: The method of any one of embodiments 26 to 29 wherein the punctured random access preamble is a version of a corresponding random access preamble that is punctured at both the beginning and the end of the corresponding random access preamble.

Embodiment 34: The method of any one of embodiments 26 to 33 wherein the punctured random access preamble is a version of a corresponding random access preamble that is punctured during a puncturing gap.

Embodiment 35: The method of embodiment 34 wherein a duration of the puncturing gap is predefined.

Embodiment 36: The method of embodiment 34 further comprising sending (1200), to the wireless device, a configuration of a duration of the puncturing gap is configured by a network node.

Embodiment 37: The method of any one of embodiments 34 to 36 wherein a duration of the puncturing gap is a function of one or more parameters (e.g., random access channel format, frequency band, and/or random access channel subcarrier spacing).

Embodiment 38: The method of any one of embodiments 34 to 36 wherein a duration of the puncturing gap is a function of estimated, predicted, or measured network load.

Embodiment 39: The method of any one of embodiments 34 to 36 wherein a duration of the puncturing gap is a function of estimated, predicted, or measured propagation delay.

Embodiment 40: The method of any one of embodiments 26 to 39 wherein detecting (1208) the punctured random access preamble comprises detecting (1208) the punctured random access preamble over a bandwidth that is wider than that used for a corresponding non-punctured random access preamble.

Embodiment 41: The method of any one of embodiments 26 to 40 wherein the punctured random access preamble is a punctured Physical Random Access Channel, PRACH, preamble.

Embodiment 42: The method of any of the previous embodiments, further comprising: obtaining user data; and forwarding the user data to a host computer or a wireless device.

Group C Embodiments

Embodiment 43: A wireless device comprising: processing circuitry configured to perform any of the steps of any of the Group A embodiments; and power supply circuitry configured to supply power to the wireless device.

Embodiment 44: A base station comprising: processing circuitry configured to perform any of the steps of any of the Group B embodiments; and power supply circuitry configured to supply power to the base station.

Embodiment 45: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 46: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 47: The communication system of the previous embodiment further including the base station.

Embodiment 48: The communication system of the previous 2 embodiments, further including the UE, wherein the UE is configured to communicate with the base station.

Embodiment 49: The communication system of the previous 3 embodiments, wherein: the processing circuitry of the host computer is configured to execute a host application, thereby providing the user data; and the UE comprises processing circuitry configured to execute a client application associated with the host application.

Embodiment 50: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 51: The method of the previous embodiment, further comprising, at the base station, transmitting the user data.

Embodiment 52: The method of the previous 2 embodiments, wherein the user data is provided at the host computer by executing a host application, the method further comprising, at the UE, executing a client application associated with the host application.

Embodiment 53: A User Equipment, UE, configured to communicate with a base station, the UE comprising a radio interface and processing circuitry configured to perform the method of the previous 3 embodiments.

Embodiment 54: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 55: The communication system of the previous embodiment, wherein the cellular network further includes a base station configured to communicate with the UE.

Embodiment 56: The communication system of the previous 2 embodiments, wherein: the processing circuitry of the host computer is configured to execute a host application, thereby providing the user data; and the UE's processing circuitry is configured to execute a client application associated with the host application.

Embodiment 57: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 58: The method of the previous embodiment, further comprising at the UE, receiving the user data from the base station.

Embodiment 59: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 60: The communication system of the previous embodiment, further including the UE.

Embodiment 61: The communication system of the previous 2 embodiments, further including the base station, wherein the base station comprises a radio interface configured to communicate with the UE and a communication interface configured to forward to the host computer the user data carried by a transmission from the UE to the base station.

Embodiment 62: The communication system of the previous 3 embodiments, wherein: the processing circuitry of the host computer is configured to execute a host application; and the UE's processing circuitry is configured to execute a client application associated with the host application, thereby providing the user data.

Embodiment 63: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 64: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 65: The method of the previous embodiment, further comprising, at the UE, providing the user data to the base station.

Embodiment 66: The method of the previous 2 embodiments, further comprising: at the UE, executing a client application, thereby providing the user data to be transmitted; and at the host computer, executing a host application associated with the client application.

Embodiment 67: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 68: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 69: The communication system of the previous embodiment further including the base station.

Embodiment 70: The communication system of the previous 2 embodiments, further including the UE, wherein the UE is configured to communicate with the base station.

Embodiment 71: The communication system of the previous 3 embodiments, wherein: the processing circuitry of the host computer is configured to execute a host application; and the UE is configured to execute a client application associated with the host application, thereby providing the user data to be received by the host computer.

Embodiment 72: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 73: The method of the previous embodiment, further comprising at the base station, receiving the user data from the UE.

Embodiment 74: The method of the previous 2 embodiments, further comprising at the base station, initiating a transmission of the received user data to the host computer.

Those skilled in the art will recognize improvements and modifications to the embodiments of the present disclosure. All such improvements and modifications are considered within the scope of the concepts disclosed herein.

The invention claimed is:

1. A method performed by a wireless device for accessing a cellular communications network in unlicensed spectrum, the method comprising:
   performing a Listen-Before-Talk, LBT, procedure during any of two or more back-to-back random access occasions;
   generating a punctured random access preamble responsive to a success of the LBT procedure, the punctured random access preamble being punctured at a beginning or an end of a corresponding random access preamble based on estimated tendency of a propagation delay; and
   transmitting the punctured random access preamble when the LBT procedure is successful.

2. The method of claim 1, wherein:
   performing the LBT procedure comprises performing the LBT procedure during a first of the two or more back-to-back random access occasions; and
   transmitting the punctured random access preamble comprises transmitting the punctured random access preamble in a second of the two or more back-to-back random access occasions succeeding the first of the two or more back-to-back random access occasions, responsive to the success of the LBT procedure.

3. The method of claim 1, wherein:
   performing the LBT procedure comprises:
      performing the LBT procedure during a first random access occasion of the two or more back-to-back random access occasions, wherein the LBT procedure fails during the first random access occasion; and
      performing the LBT procedure at a beginning portion of a second random access occasion of the two or more back-to-back random access occasions that succeeds the first random access occasion, wherein the LBT procedure succeeds during the beginning portion of the second random access occasion; and
   generating the punctured random access preamble comprises generating the punctured random access preamble responsive to the success of the LBT procedure during the beginning portion of the second random access occasion; and
   transmitting the punctured random access preamble comprises transmitting the punctured random access preamble in the second random access occasion starting after the beginning portion of the second random access occasion in which the LBT procedure was performed.

4. The method of claim 1, wherein:
- performing the LBT procedure comprises performing the LBT procedure during any one of the two or more back-to-back random access occasions; and
- transmitting the punctured random access preamble comprises transmitting the punctured random access preamble in the any one of the two or more back-to-back random access occasions.

5. The method of claim 1 wherein transmitting the punctured random access preamble comprises transmitting the punctured random access preamble in one of the two or more back-to-back random access occasions such that the punctured random access preamble creates a gap between the one of the two or more back-to-back random access occasions and at least one other of the two or more back-to-back random access occasions.

6. The method of claim 1 wherein the punctured random access preamble is adapted to create a puncturing gap at a beginning and/or an end of a respective one of the two or more back-to-back random access occasions.

7. The method of claim 6 wherein a duration of the puncturing gap is adapted based on an outcome of the LBT procedure.

8. The method of claim 6 wherein the duration of the puncturing gap is less than or equal to a predefined or configured maximum gap size.

9. The method of claim 6 wherein the duration of the puncturing gap is one of a number of predefined or configured possible gap sizes.

10. The method of claim 1 wherein generating the punctured random access preamble comprises determining whether to puncture a corresponding random access preamble at the beginning of the corresponding random access preamble or at the end of the corresponding random access preamble, to provide the punctured random access preamble, based on one or more parameters related to propagation delay.

11. The method of claim 1 wherein transmitting the punctured random access preamble comprises transmitting the punctured random access preamble at a transmit power that compensates for a shortened duration of the punctured random access preamble as compared to a corresponding non-punctured random access preamble.

12. The method of claim 1 wherein transmitting the punctured random access preamble comprises transmitting the punctured random access preamble over a bandwidth that is wider than that used for transmitting a corresponding non-punctured random access preamble.

13. The method of claim 1 further comprising:
- performing a second LBT procedure during a first random access occasion of a second set of two or more back-to-back random access occasions;
- generating a random access preamble without puncturing responsive to a success of the second LBT procedure prior to a start of a second random access occasion of the second set of two or more back-to-back random access occasions; and
- transmitting the random access preamble in the second random access occasion of the second set of two or more back-to-back random access occasions.

14. The method of claim 1, wherein the two-or-more back-to-back random access occasions are separated by a gap substantially less than a symbol duration.

15. A wireless device comprising:
- processing circuitry configured to:
  - perform a Listen-Before-Talk, LBT, procedure during any of two or more back-to-back random access occasions;
  - generate a punctured random access preamble responsive to a success of the LBT procedure, the punctured random access preamble being punctured at a beginning or an end of a corresponding random access preamble based on estimated tendency of a propagation delay; and
  - transmit the punctured random access preamble when the LBT procedure is successful.

* * * * *